(12) United States Patent
Subramanian et al.

(10) Patent No.: US 9,929,916 B1
(45) Date of Patent: Mar. 27, 2018

(54) ACHIEVING STATEFUL APPLICATION SOFTWARE SERVICE BEHAVIOR IN DISTRIBUTED STATELESS SYSTEMS

(71) Applicant: Aspen Technology, Inc., Burlington, MA (US)

(72) Inventors: Ashok R. Subramanian, Cambridge, MA (US); Samuel Provencher, Waltham, MA (US); Edward Campbell, Hudson, NH (US)

(73) Assignee: Aspen Technology, Inc., Bedford, MA (US)

(*) Notice: Subject to any disclaimer, the term of this patent is extended or adjusted under 35 U.S.C. 154(b) by 639 days.

(21) Appl. No.: 14/187,958

(22) Filed: Feb. 24, 2014

Related U.S. Application Data

(63) Continuation-in-part of application No. 13/931,715, filed on Jun. 28, 2013, now Pat. No. 9,569,480, which is a continuation-in-part of application No. 13/875,680, filed on May 2, 2013, now Pat. No. 9,442,475.

(51) Int. Cl.
| | | |
|---|---|---|
| *G06G 7/48* | (2006.01) | |
| *H04L 12/24* | (2006.01) | |
| *G06F 3/0484* | (2013.01) | |

(52) U.S. Cl.
CPC ............ *H04L 41/22* (2013.01); *G06F 3/0484* (2013.01)

(58) Field of Classification Search
CPC ............................... H04L 41/22; G06F 3/0484
USPC .......................................................... 703/10
See application file for complete search history.

(56) References Cited

U.S. PATENT DOCUMENTS

| | | |
|---|---|---|
| D403,673 S | 1/1999 | Arora et al. |
| D420,995 S | 2/2000 | Imamura et al. |
| D451,928 S | 12/2001 | Van Huong |
| D454,138 S | 3/2002 | Imamura et al. |
| D462,695 S | 9/2002 | Nguyen Van Huong |
| D500,766 S | 1/2005 | Hanisch et al. |
| D547,365 S | 7/2007 | Reyes et al. |
| D592,223 S | 5/2009 | Neuhaus |
| D593,120 S | 5/2009 | Bouchard et al. |
| D598,468 S | 8/2009 | Hirsch et al. |

(Continued)

OTHER PUBLICATIONS

Mathur—Jan. 30, 2013 (Failure Handling in YARN—Map Reduce v2, Jan 30, 2013).*

(Continued)

*Primary Examiner* — Brian S Cook
(74) *Attorney, Agent, or Firm* — Hamilton, Brook, Smith & Reynolds, P.C.

(57) ABSTRACT

A resource manager service, system, apparatus and method manages resources for a user group of at least one user by utilizing a resource adapter. The resource adapter serves as a smart proxy to mimic the user of a desktop software application preserving the interaction model with the application. Embodiments of the invention allow integration of desktop software in a distributed enterprise system, as a service, without requiring non-trivial modifications to the application code or to alter its workflows in any material way. A resource manager service, system, apparatus and method treat instances of the resource adapters, smart proxies, as finite but reusable resources that can be allocated and "bound" to a given user for an unspecified duration.

17 Claims, 11 Drawing Sheets

(56) References Cited

U.S. PATENT DOCUMENTS

| | | |
|---|---|---|
| D606,091 S | 12/2009 | O'Donnell et al. |
| D607,007 S | 12/2009 | Kocmick |
| 7,627,694 B2 | 12/2009 | Sreenivasan et al. |
| D614,192 S | 4/2010 | Takano et al. |
| D624,928 S | 10/2010 | Agnetta et al. |
| D628,584 S | 12/2010 | Umezawa |
| D629,410 S | 12/2010 | Ray et al. |
| 8,041,400 B2 | 10/2011 | Kim |
| D657,377 S | 4/2012 | Vance et al. |
| D658,204 S | 4/2012 | Jones |
| D660,313 S | 5/2012 | Williams et al. |
| D661,369 S | 6/2012 | Nelson |
| D674,405 S | 1/2013 | Guastella et al. |
| D678,320 S | 3/2013 | Kanalakis, Jr. et al. |
| D678,894 S | 3/2013 | Kanalakis, Jr. et al. |
| D678,895 S | 3/2013 | Ebler et al. |
| D681,663 S | 5/2013 | Phelan et al. |
| D681,664 S | 5/2013 | Phelan et al. |
| D681,667 S | 5/2013 | Phelan |
| D682,293 S | 5/2013 | Kanalakis, Jr. et al. |
| D682,847 S | 5/2013 | Gardner et al. |
| D682,866 S | 5/2013 | Peters et al. |
| D687,063 S | 7/2013 | Myung et al. |
| D688,692 S | 8/2013 | Tanghe et al. |
| D691,160 S | 10/2013 | Schupp et al. |
| D694,257 S | 11/2013 | McKinley et al. |
| 8,629,878 B2 * | 1/2014 | Jackson .............. G06F 9/45558 345/522 |
| D698,816 S | 2/2014 | Phelan et al. |
| D699,746 S | 2/2014 | Pearson et al. |
| D700,197 S | 2/2014 | Akcasu et al. |
| D700,198 S | 2/2014 | Akcasu et al. |
| D700,208 S | 2/2014 | Phelan et al. |
| D704,207 S | 5/2014 | Lee et al. |
| D704,733 S | 5/2014 | Jewitt |
| D706,828 S | 6/2014 | Hollobaugh |
| D709,077 S | 7/2014 | Jonsson et al. |
| 8,788,068 B2 | 7/2014 | Kocis et al. |
| D710,892 S | 8/2014 | Hollobaugh et al. |
| D722,075 S | 2/2015 | Zhang et al. |
| D726,214 S | 4/2015 | Wantland et al. |
| D729,836 S | 5/2015 | Lee |
| D730,388 S | 5/2015 | Rehberg et al. |
| D730,394 S | 5/2015 | Bray |
| D730,397 S | 5/2015 | Oh et al. |
| D730,932 S | 6/2015 | Kim et al. |
| D730,952 S | 6/2015 | Siboni et al. |
| D731,521 S | 6/2015 | Hco et al. |
| D731,525 S | 6/2015 | Myers |
| D733,167 S | 6/2015 | Schoger et al. |
| 9,046,881 B2 | 6/2015 | Blevins et al. |
| D737,299 S | 8/2015 | Hisada et al. |
| D737,321 S | 8/2015 | Lee |
| D741,360 S | 10/2015 | Connolly et al. |
| D747,735 S | 1/2016 | Jung et al. |
| D750,123 S | 2/2016 | Subramanian et al. |
| 9,354,776 B1 | 5/2016 | Subramanian et al. |
| 9,442,475 B2 | 9/2016 | Subramanian et al. |
| 9,569,480 B2 | 2/2017 | Provencher et al. |
| 9,646,117 B1 | 5/2017 | Kotzabasakis et al. |
| D790,572 S | 6/2017 | Subramanian et al. |
| 2002/0194324 A1 | 12/2002 | Guha |
| 2003/0041095 A1 * | 2/2003 | Konda .............. G06F 17/30569 709/201 |
| 2003/0182349 A1 * | 9/2003 | Leong .................... G06F 3/061 718/100 |
| 2006/0146877 A1 * | 7/2006 | Srivastava ............ G06F 9/5055 370/469 |
| 2006/0173957 A1 | 8/2006 | Robinson et al. |
| 2007/0061457 A1 * | 3/2007 | Li .................... H04L 29/12132 709/225 |
| 2009/0076681 A1 * | 3/2009 | Yasue ................. G06F 11/1446 701/33.4 |
| 2010/0088654 A1 | 4/2010 | Henhoeffer |
| 2010/0332273 A1 | 12/2010 | Balasubramanian et al. |
| 2012/0029661 A1 | 2/2012 | Jones et al. |
| 2013/0179894 A1 * | 7/2013 | Calder .................. G06F 9/5027 718/104 |
| 2013/0339100 A1 | 12/2013 | Warrick et al. |
| 2014/0267425 A1 | 9/2014 | Moll et al. |
| 2014/0330542 A1 | 11/2014 | Subramanian et al. |
| 2014/0330783 A1 | 11/2014 | Provencher et al. |
| 2014/0379112 A1 | 12/2014 | Kocis |
| 2015/0244884 A1 | 8/2015 | Sensu et al. |

OTHER PUBLICATIONS

Kumar_2012 (Apache Hadoop YARN—ResourceManager, Hortonworks, Aug. 31, 2012).*
Technopedia dated 2012 and downloaded from the Wayback Machine at http://web.archive.org/web/20121026005853/https://www.techopedia.com/definition/24804/enterpris.*
Nagy_2009 (Chapter 14 Challenges of Middleware for the Internet of Things, Automation Control—Theory and Practice Ed. A.D. Rodi, ISBN 978-953-307-039-1, InTech, Dec. 1, 2009).*
IBM_1973 (IBM Technical Disclosure Bulletin, Dec. 1973, NN73122330).*
IBM_1992 (IBM Technical Disclosure Bulletin, Mar. 1992, NB9203234).*
Murthy—Aug. 15, 2012 (Apache Hadoop YARN—Concepts and Applications, Hortonworks, Aug. 15, 2012).*
"AspenTech Announces Availability of aspenOne® V8 Process Optimization Software", Dec. 10, 2012, PDF downloaded from http://www.aspentech.com/_ThreeColumnLayout.aspx?pageid=21474856808zid=15032387367, (3 pages) on Mar. 11, 2014.
"AspenTech Brings Search and High Performance Trending to Manufacturing Execution Systems with New Release of Aspen InfoPlus.21® Software", Mar. 6, 2012, PDF downloaded from http://www.aspentech.com/_ThreeColumnLayout.aspx?pageid=21474856808&id=15032385728, (2 pages) on Apr. 29, 2013.
"New Release of Aspen Plus® Software Delivers an Innovative New Interface and Opens Process Simulation to a Wider Range of New Users", Mar. 6, 2012, PDF downloaded from http://www.aspentech.com/_ThreeColumnLayout.aspx?pageid=21474856808&id=15032385734, (3 pages) on Apr. 29, 2013.
"New Release of Aspen PIMS™ and Aspen Petroleum Scheduler™ Software Improves Collaboration Between Refining Planners and Schedulers", Mar. 6, 2012, PDF downloaded from http://www.aspentech.com/_ThreeColumnLayout.aspx?pageid=21474856808&id=15032385732, (2 pages) on Apr. 29, 2013.
"New Release of aspenONE® Software Enables Process Engineers to Display Real-Time Data on Simulation Flowsheets for the First Time", May 14, 2012, PDF downloaded from http://www.aspentech.com/_ThreeColumnLayout.aspx?pageid=21474856808&id=15032386067, (2 pages) on Apr. 29, 2013.
"Version 8.4 of aspenONE® Software Expands Activation Capability to Optimize Energy, Economics, and Heat Exchanger Designs", Nov. 25, 2013, PDF downloaded from http://www.aspentech.com/_ThreeColumnLayout.aspx?pageid=21474856808&id=15032390879, (3 pages) on Mar. 11, 2014.
U.S. Appl. No. 14/186,796, filed Feb. 21, 2014, "Applied Client-Side Service Integrations in Distributed Web Systems".
U.S. Appl. No. 14/101,216, filed Dec. 9, 2013, "Activated Workflow".
Pillai, et al., "Development of Supervisory Control and Data Acquisition system for Laboratory Based Mini Thermal Power Plant using LabVIEW," International Journal of Emerging Technology and Advanced Engineering, (ISSN 2250-2459, vol. 2, Issue 5, May 2012).
Hashiguchi, et al, "Wide-area Integrated SCADA System Designed to Improve Availability and Flexibility, " Hitachi Review, vol. 60 (2011), No. 7, p. 399.

(56) References Cited

OTHER PUBLICATIONS

"New Assay Management Functionality in Aspen PIMS™ Software Optimizes Crude Purchasing Decisions and Increases Profitability," Aug. 27, 2012, PDF downloaded from http://www.aspentech.com/_ThreeColumnLayout.aspx?pageid=2147485680&id=15032386682, (2 pages) on Mar. 11, 2014.

U.S. Appl. No. 29/550,221, filed Dec. 31, 2015, "Display Screen With Graphical User Interface,".

Notice of Allowance and Fee(s) Due for U.S. Appl. No. 14/186,796, "Applied Client-Side Service Integrations in Distributed Web Systems," dated Apr. 4, 2016.

Notice of Allowance and Fee(s) Due for U.S. Appl. No. 13/875,680, "Method and System to Unify and Display Simulation and Real-Time Plant Data for Problem-Solving," dated Jun. 20, 2016.

Hughes, J., "What is a Microsoft Failover Cluster Virtual Adapter anyway?," dated Feb. 13, 2009, 18 pages, retrieved from https://web.archive.org/web/20160810142046/https://blogs.technet.microsoft.com/askcore/2009/02/13/what-is-a-microsoft-failover-cluster-virtual-adapter-anyway/.

Wikipedia, "Element (mathematics)," archived definition dated Nov. 28, 2012, 3 pages, retrieved from https://en.wikipedia.org/w/index.php?title=Element_(mathematics)&oldid=525288249.

Altair HyperStudy; 137 pp.; Sep. 2009; obtained from http://blog.altair.co.kr/wp-content/uploads/2011/03/hyperstudy_10-0.pdf.

Meeks, Hutson, BPPM Self Monitoring Core Components—How-To Video Series, Mar. 30, 2012, downloaded from https://communities.bmc.com/docs/DOC-18939.

Notice of Allowance and Fee(s) Due for U.S. Appl. No. 13/931,715, "Method and System for Stateful Recovery and Self-Healing," dated Dec. 21, 2016.

Non-Final Office Action for U.S. Appl. No. 13/875,680, "Method and System to Unify and Display Simulation and Real-Time Plant Data for Problem-Solving," dated Mar. 10, 2016.

Amendment to Non-Final Office Action for U.S. Appl. No. 13/875,680, "Method and System to Unify and Display Simulation and Real-Time Plant Data for Problem-Solving," dated May 17, 2016.

Non-Final Office Action for U.S. Appl. No. 13/931,715, "Method and System for Stateful Recovery and Self-Healing," dated Aug. 4, 2016.

Amendment to Non-Final Office Action for U.S. Appl. No. 13/931,715, "Method and System for Stateful Recovery and Self-Healing," dated Sep. 8, 2016.

Non-Final Office Action for U.S. Appl. No. 14/186,796, "Applied Client-Side Service Integrations in Distributed Web Systems," dateed Nov. 18, 2015.

Amendment to Non-Final Office Action for U.S. Appl. No. 14/186,796, "Applied Client-Side Service Integrations in Distributed Web Systems," dated Feb. 11, 2016.

Notice of Allowance and Fee(s) Due for U.S. Appl. No. 14/101,216, "Activated Workflow," dated Feb. 7, 2017.

\* cited by examiner

US 9,929,916 B1

ACHIEVING STATEFUL APPLICATION SOFTWARE SERVICE BEHAVIOR IN DISTRIBUTED STATELESS SYSTEMS

RELATED APPLICATIONS

This application is a continuation-in-part of U.S. application Ser. No. 13/931,715, filed on Jun. 28, 2013, which is a continuation-in-part of U.S. application Ser. No. 13/875,680, filed on May 2, 2013. The entire teachings of the above applications are incorporated herein by reference.

BACKGROUND OF THE INVENTION

Software is often designed and coded to run on a single thread and to meet the service needs of a single user. As such, desktop applications are in conflict with even the simplest definition of a Service which is stateless and engineered to run in perpetuity once it is started. Solutions addressing the challenges for migrating desktop software into Service Oriented Architectures (SOA) are needed.

Computer application programs have evolved from stand alone operation to operation through various computer network configurations. Computer networks have further developed from LAN or WAN (Local or Wide Area Networks) to Global networks such as the Internet. As an outgrowth, web and cloud computing along with software as a service (SAS) came into existence.

Web applications and related computing platforms are not without limitations and disadvantages generally speaking. Some challenges faced by web applications include latent communication, weak presentation layer, access via devices, and a lack of standards and/or adherence to standards. Various improvements, in particular in supporting enterprise services in web applications are desired.

SUMMARY OF THE INVENTION

The invention involves taking a desktop software application and through the use of a Resource Adapter (or "smart proxy"), run and have the adapter become a stand-in for the user, such that the interaction model with the application is preserved. This solution makes it possible to integrate desktop software in a distributed enterprise system, as a service, without requiring non-trivial modifications to the application code or to alter its workflows in any material way. This achievement is accomplished through the use of a Resource Manager, who treats instances of the proxies as finite but reusable resources that can be allocated and "bound" to a given user for an unspecified duration.

Embodiments of the present invention provide a method, a computer system, and a computer program product for managing resources for a user group of at least one user. One or more Resource Adapters are registered with a computer processor executed Resource Manager during initialization, and each Resource Adapter controls a coupled application instance. A request for the application instance is made through a user interface by a given user of the user group by contacting the Resource Manager with the request. The request may be made by a Client Adapter. The Resource Manager in an automated manner verifies an availability of the requested application instance. If a Resource Adapter coupled or connected to the application instance is available, the Resource Manager generates a binding identification. The Resource Manager communicates a binding notification to activate the Resource Adapter.

In example embodiments, activating the Resource Adapter employs a Resource Agent, wherein the resource agent runs locally on a Service Platform server.

In some embodiments, a Monitor detects failures from either or both the Resource Adapter and the application instance.

In another embodiment, service access is provided to the given user of the user group by requests made through a user interface to the Resource Adapter, wherein the Resource Adapter receives requests and publishes: events, responses, heartbeat messages and notifications on behalf of itself and the application instance.

In some embodiments, the Resource Manager uses the published information including heartbeat messages to determine the availability of the Resource Adapter coupled to the application instance.

The resource manager is a computer-based (e.g., web enabled) service.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
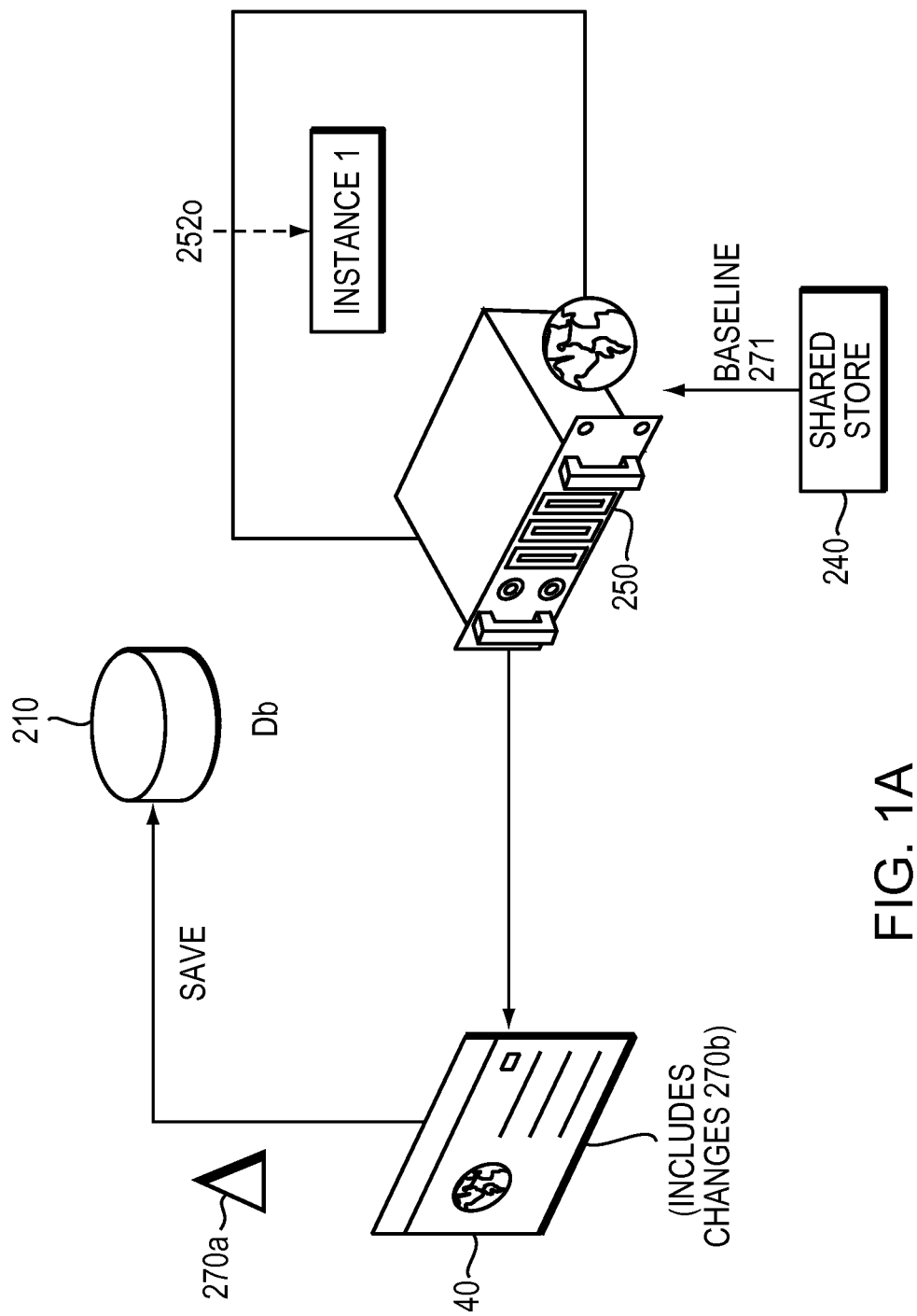
FIG. 1A is a schematic illustration of model changes being stored in embodiments.

A description of example embodiments of the invention follows.

Computer systems, including but not limited to both single-user and multiple-user client/server systems that include hardware and software components, have demanding change request requirements and failover requirements. Such computer systems apply to a variety of industries, including the process industry which is a demanding industry that goes through rigorous planning, designing, construction, and operating procedures. The process industry has extensive simulation and computing needs. In the process industry, plant conditions fluctuate all the time, and the plant also has multiple modes of operation, e.g. summer mode, winter mode; normal throughput, reduced or increased throughput; also different grades of product or a different feedstock require the plant to operate in a different mode. In the process industry, many process and plant model and file changes are required to support the demands of the process industry and fluctuating plant conditions. In such a dynamic environment that requires frequent changes to models and files, a method and system is needed that addresses failover situations gracefully so that changes are not lost.

An embodiment of the proposed approach applies non-destructive editing in software models and files. One advantage of an embodiment of the proposed approach is that non-destructive editing means that multiple users may make changes to the same file without having one user's changes overwrite another user's changes. This is accomplished by coding the plant processing software or simulator, such as aspenONE (Trademark of Assignee), to "remember" the changes that a given user makes to a model and stores those changes in a given user's account (of the invention system), where the changes do not affect the other users and all users have their own private set or sets of changes. In the preferred embodiment of the proposed approach, changes are initially private and the baseline model itself is preferably not changed. In one embodiment, a single user may merge or share his sets of changes to a model. In an alternative embodiment, users may merge or share changes to a model instead of employing a private change approach. A given user may receive a copy of the other user's changes or gain access to such changes as part of a collaborative workflow, which is also embodied in the invention.

In an example scenario, loading the original model file and reapplying the changes restores the user's state and lets the user pick up where the last user left off, and in example embodiments, the user and the last user are the same user. Recovery from a critical failure in a simulator is preferably similar to starting over where opening a saved simulation triggers the process software or simulator to pull the user's modifications from the user's account and applies the user's modifications to the baseline model, thereby restoring the state. In addition, additional unsaved changes (not saved in the user's account) held in computer memory (working memory generally) may be retrieved for the user and these unsaved changes are also included as part of the saved modification set.

Another advantage of an embodiment of the proposed approach includes an advanced concept of autonomous self-healing where the system components detect simulator failure conditions and take pro-active steps behind the scenes by assigning a new simulator, while attempting to recycle the failed instance. The system loads the data and reapplies the changes that were in effect when the failure occurred, for example, when the Application Instance running as a Service Instance fails but the Web Application remains viable. In one embodiment of the proposed approach, this autonomous self-healing is performed before a user is aware of a problem with the simulator.

Another advantage of an embodiment of the proposed approach is an improved change management strategy compared to existing change management strategies. Existing change management strategies apply source control (such as Clearcase and CVS) to change files, through multiple users, and the file changes result in different versions of a baseline, that are stored in a repository. In existing systems, the latest baseline version of the file is comparable to a single source of truth. By contrast, an embodiment of the proposed approach provides multiple sources of truth where every user has an independent source of truth. In an embodiment of the proposed approach, individual user preferences and individual user changes are stored in user preference storage (or content storage) and each user may have his own source of truth. Rather than just saving a new baseline for each version, an embodiment of the proposed approach saves the changes relative to an initial/original user baseline, which is more convenient to the user.

Another advantage of an embodiment of the proposed approach is that it includes a user-centric focus. By contrast, in existing source control environments, the focus is repository-centric. An embodiment of the proposed approach includes a focus on the individual preferences and needs of the system developers. In an embodiment of the proposed approach, user deltas and user preferences are saved. By saving user deltas and user preferences, live sessions may be moved to new machines. In some embodiments, the administrative console can migrate to a different machine. Through a Resource Manager Service using Resource Adapters, the system has incredible flexibility and leverages behavior that mimics a user on desktop software in a distributed enterprise system, as a service, without requiring non-trivial modifications to the application code or to alter its workflows in any material way.

An embodiment of the proposed approach includes a computer-implemented method of managing data for a user group of at least one user comprising forming a set of change groups, made through a user interface by a given user of the user group, wherein a given change group of a set of change groups is associated with the given user of the user group, wherein the given user of the user group makes changes to a model, starting from a baseline that is retrieved from a storage group. The approach further includes storing the baseline in a shared file storage included in the storage group. An embodiment of the proposed approach further comprises storing, upon a save operation, a first set of changes from the given change group, to a user-authenticated content storage included in the storage group. The approach further comprises continuously tracking changes made after the save operation and storing both a remaining set of changes from the given change group, including the changes made after the save operation, and the first set of changes from the given change group, to a local memory included in the storage group.

The computer-implemented method may include the model being associated with an application instance and further comprising the following computer-implemented step: detecting a switchover event, through a Resource Manager, that identifies the application instance as an application instance identified for removal, through the Resource Manager communicating with an Adapter associated with the application instance. The computer-implemented method may include the following computer-implemented steps: removing the association between the model and the application instance, through the Resource Manager; terminating the application instance identified for removal, as a result of a command sequence initiated by the Resource Manager, in parallel with the following steps; replacing the application instance identified for removal with a new application instance based upon a replacement initiation from the Resource Manager; associating the model with the new application instance, through the Resource Manager; and restoring to the new application instance, the given change group and the baseline, from the storage group, through a model restoration procedure initiated by the Resource Manager and implemented by the Adapter.

The computer-implemented method may have the model including at least one file, a simulation model, or an application model. The computer-implemented method may include the Adapter (described more fully below) associated with the application instance intercommunicating with both the application instance and the Resource Manager, and the Adapter may terminate, restart, or repair the application instance. In some embodiments, the Adapter shuts down or terminates the Application Instance when the Application Instance is no longer needed, and the temporary files associated with the Application Instance are cleaned up or removed. The computer-implemented method may include a secondary process (a monitor) that monitors the Adapter. In the event that the Adapter dies, the monitor will terminate the running application instance and itself. The computer-implemented method may include the monitor monitoring both the Adapter and the application instance.

The computer-implemented method may include the switchover event including a failover event detected by a loss of one or more periodic heartbeat messages sent from the application instance 252 to the Resource Manager 230 through a Resource Adapter 251. The computer-implemented method may include the switchover event resulting from an interrogation command sent from the Resource Manager 230 to the application instance 252 that fails to respond with an expected acknowledgement. The computer-implemented method may include the switchover event including intervals of regular maintenance as administered by an administration dashboard. In some embodiments, the switchover event including intervals of regular maintenance may be initiated by human action as opposed to automated logic. In some embodiments, the loss of one or more periodic heartbeat messages sent from the application instance through the Resource Adapter 251 to the Resource Manager 230 indicates problems with the application instance and/or the Resource Adapter 251, and the Resource Manager 230 may proactively take action including replacing the problematic Resource Adapter 251 and Application Instance 252 and moving the problematic Resource Adapter 251 to the dead pool and killing the associated Application Instance 252.

The computer-implemented method may include the model being associated with a new application instance, in addition to being associated with the application instance, and subsequently after detecting the switchover event, the application instance is no longer associated with the model, thereby replacing the application instance identified for removal with the new application instance in a seamless manner, such that a live user service session is not interrupted or modified, wherein a redundant mirrored application instance is applied as the new application instance. The new application instance may be given the same binding identification information or data, which eliminates the need to update the Client tier binding data as the Client tier now routes requests to the new application instance with a reconstituted state and session.

The computer-implemented method may include the given change group of the set of change groups being private such that it does not interfere with a set of remaining change groups from the set of change groups. The computer-implemented method may include the given change group of the set of change groups being merged with at least one change group of a set of remaining change groups from the set of change groups. The computer-implemented method may include the given change group of the set of change groups being shared with at least one change group of a set of remaining change groups from the set of change groups.

An embodiment of the proposed approach may include a computer system of managing data for a user group of at least one user comprising the following computer-implemented elements. A user interface that, through interaction with a given user of the user group, forms a change group of a set of change groups, wherein the given user of the user group makes changes to a model, starting from a baseline that is retrieved from a storage group, wherein the model is associated with an application instance. A shared file storage that stores the baseline included in the storage group; a user-authenticated content storage that stores, upon a save operation, a first set of changes from the given change group, and is included in the storage group. A local memory that is included in the storage group and continuously tracks changes made after the save operation and stores a remaining set of changes from the given change group including the changes made after the save operation, and the first set of changes from the given change group. A Resource Manager 230 that detects a switchover event and identifies the application instance as an application instance identified for removal, through the Resource Manager 230 communicating with the Resource Adapter 251 associated with the application instance 252, and removes the association between the model and the application instance. The Resource Manager 230 initiates a command sequence that results in termination of the application instance identified for removal, in parallel with the steps below: a new application instance replaces the application instance identified for removal based upon on a replacement initiation from the Resource Manager 230; and the Resource Manager 230 associates the model with the new application instance and initiates a model restoration procedure, implemented by the Resource Adapter, that restores the given change group and the baseline to the new application instance.

The model of the computer system may include at least one file, a simulation model, or an application model. The computer system may include the Adapter 251 (described more fully below) associated with the application instance 252 intercommunicates with both the application instance 252 and the Resource Manager 230, and the Adapter 251 may terminate, restart, or repair the application instance 252. A secondary process (the monitor 253) may monitor both the Adapter 251 and the application instance 252. If the monitor 253 detects a failure of the Adapter 251, the monitor 253 may terminate the application instance 252 and itself.

The computer system and computer program product may include the switchover event including a failover event detected by a loss of one or more periodic heartbeat messages sent from the Resource Adapter 251 on behalf of the application instance 252 to the Resource Manager 230, the switchover event results from an interrogation command sent from the Resource Manager 230 to the application instance 252 that fails to receive an expected acknowledgement, or the switchover event includes regular maintenance as administered by an administration dashboard. The computer system may include the service such as a model being associated with a new application instance, in addition to being associated with the application instance, and subsequently after detecting the switchover event, the application instance is no longer associated with the service such as a model, thereby replacing the application instance identified for removal with the new application instance in a seamless manner, such that a live user service session is not interrupted or modified, wherein a redundant mirrored application instance is applied as the new application instance.

The computer system may include the given change group of the set of change groups is private such that it does not interfere with a set of remaining change groups from the set of change groups, or the given change group of the set of change groups may be merged with or shared with at least one change group of a set of remaining change groups from the set of change groups.

In an embodiment, the computer program product may include: one or more non-transitory computer-readable storage media having computer-executable components for use in managing information for a user group of at least one user, said computer-executable components comprising the following. A user interface that, through interaction with a given user of the user group, forms a change group of a set of change groups, wherein the given user of the user group makes changes to a model, starting from a baseline that is retrieved from a storage group, wherein the model is associated with an application instance. A shared file storage that stores the baseline included in the storage group; a user-authenticated content storage that stores, upon a save operation, a first set of changes from the given change group, and is included in the storage group; a local memory that is included in the storage group and continuously tracks changes made after the save operation and stores a remaining set of changes from the given change group including the changes made after the save operation, and the first set of changes from the given change group. A Resource Manager that detects a switchover event and identifies the application instance as an application instance identified for removal, through the Resource Manager communicating with an Adapter associated with the application instance, and removes the association between the model and the application instance. The Resource Manager initiates a command sequence that results in termination of the application instance identified for removal, in parallel with the steps below: a new application instance replaces the application instance identified for removal based upon on a replacement initiation from the Resource Manager; and the Resource Manager associates the model with the new application instance and initiates a model restoration procedure, implemented by the Adapter, that restores the given change group and the baseline to the new application instance.

One of the strengths of Service Oriented Architectures is the ability to share application resources across many clients; that flexibility comes in part, from stateless service behavior. However, sometimes stateful service patterns are employed as part of a migration of single-user stateful software to a distributed paradigm or for other reasons. Non-destructive editing normally involves a baseline from which a user works and the system maintains a list of changes to that baseline, where a list of changes is preferably referred to as a delta. One disadvantage of existing methods is that loss of state is always possible as services may exhibit failure behavior including the following: stalling, slowing to a crawl or simply failing outright. An embodiment of the proposed approach detects at least this failure behavior, and adopts proactive steps by its intelligent self-healing systems. As the delta evolves, changes to the delta are written to persistent store.

FIG. 1A is a representation of changes being stored to a model. At a high level, a model is associated with an application instance 252o that is stored inside of a Service Platform 250. Three types of data collectively form a model, including the baseline 271, and a set of changes (delta) 270 that includes a first set of changes (delta) 270a and a second set of changes (delta) 270b. The baseline model 271 is initially retrieved from a shared store 240. The baseline model 271 may be at least one file, a simulation model, or an application model that includes, but is not limited to, process control, planning, scheduling, manufacturing, accounting, manufacturing supply chain (MSC) products, supply chain logistics, anything that requires automation in a plant or process, anything that performs processing of crude oil, plant data, or other types. The baseline model 271 is displayed to the user through a client user interface 40 and the user may interact with and modify the baseline model 271, making changes (deltas 270 including at least 270a, 270b) to form a changed model. When a user performs a "save" operation then any deltas 270a are saved to a user preference storage service 210 (which also may include a content storage service). Local memory associated with the client 40 stores both the deltas 270a and any changes 270b made since the "save" operation.

In some embodiments, storage is achieved via a path including a WebServer that supports WebSocket connections. Communication may be bidirectional. Communication and storage may be long lived.

Figure 1B:
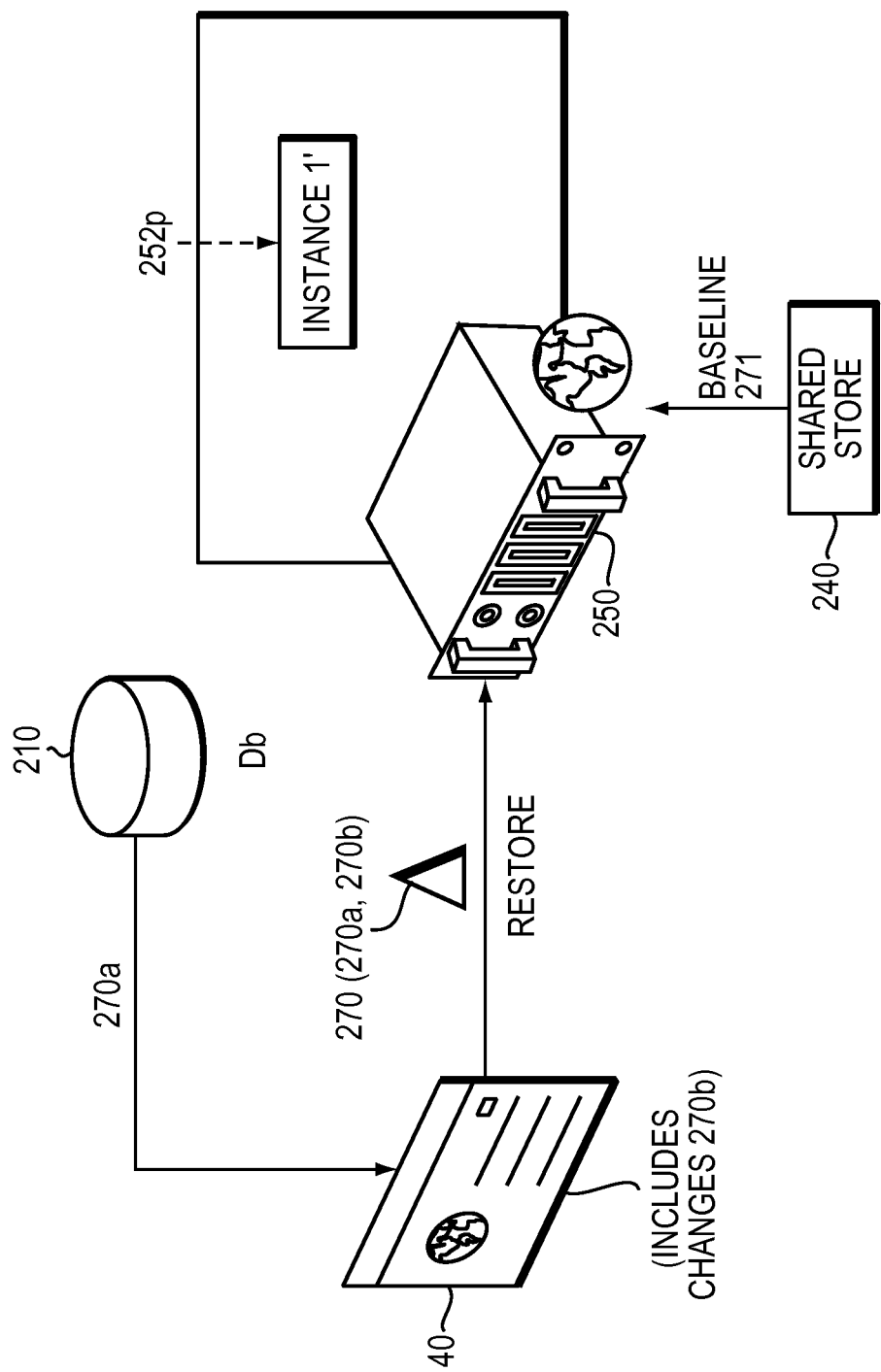
FIG. 1B is a schematic illustration of model changes from a session in FIG. 1A being restored in a subsequent session in embodiments.

FIG. 1B is a representation of model changes from FIG. 1A being restored in an embodiment. As shown in FIG. 1B, restoration preferably includes restoration of the model and the cumulative deltas 270. A "restore" operation preferably includes creation of a new application instance 252p that has the characteristics of the old application instance 252o. The "restore" operation also transfers the entire model associated with the old application instance 252o to the new application instance 252p, including the saved baseline 271 from storage 240, the changes 270 including saved changes 270a, and any additional changes 270b since the last "save" operation that are stored on the memory associated with the client 40 and these changes are made through the user interface 40.

Some example situations where restoration is performed include, but are not limited to, the following. For example, restoration is performed if the application instance 252o becomes defunct and needs to be replaced by a replacement application instance 252p. In another example, the application instance 252o is brought down and restored later with 252p due to regular system maintenance. In yet another example, a user is working on a desktop at work, and then also wants to work later in the evening at home through a smart phone, so the user performs the "save" operation prior to (or by) closing out of the desktop application, and the user subsequently performs the "restore" operation by re-opening the application through the smart phone later in the evening.

The path of the restore may include data delivery to the Web Application through a WebServer or a WebSocket. In embodiments, a save operation and a subsequent restoration occur during the same session. In other embodiments, a save operation and a subsequent restoration occur during different or separate sessions.

Figure 1C:
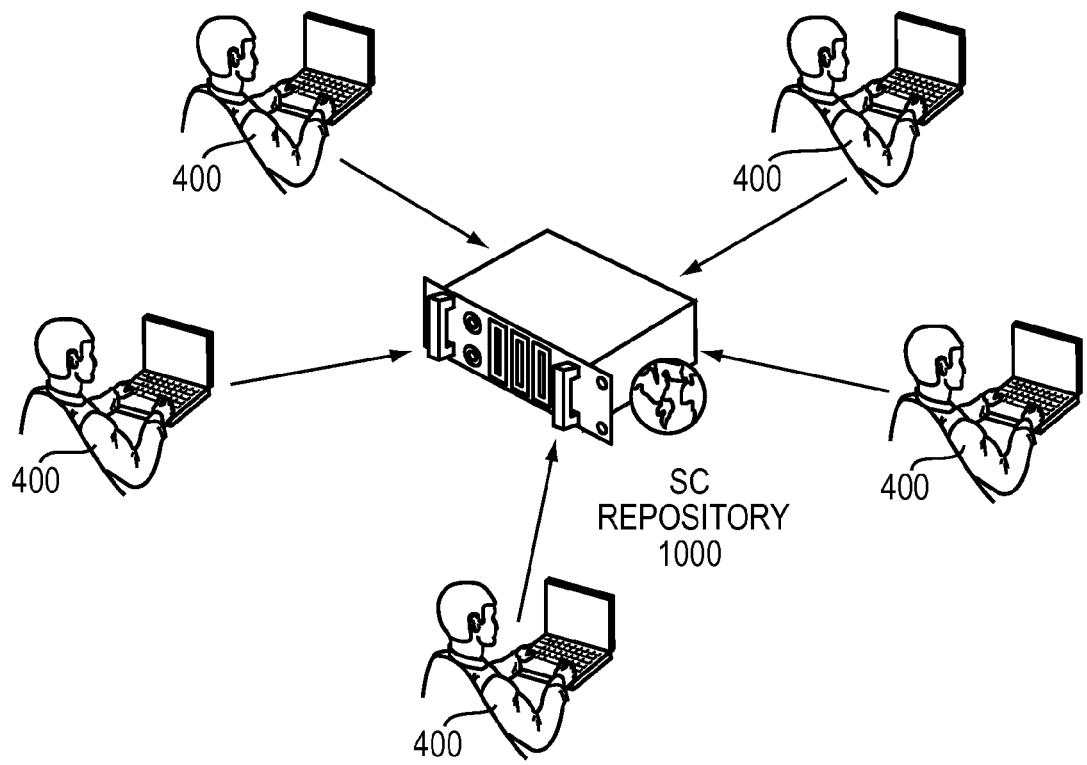
FIG. 1C is a schematic illustration of prior art source control systems.

As described earlier, another advantage of an embodiment of the proposed approach is how it improves over the existing source control mechanisms. FIG. 1C is a representation of prior art source control systems. Normally, with source control systems, developers 400 work locally to directly/destructively modify a copy of the baseline code 271 that comes from a Source Control Repository 1000. The result is a set of one or more files that differ from what is stored in the repository. In this scenario, the repository constitutes the "single source of truth" for the code base. The changes that a developer makes are not persisted anywhere beyond the modifications to the files that exist locally; if the file gets deleted, it is considered acceptable as it is not perceived as having any significant value. This is a destructive edit scenario, where a system maintains a record of which destructive edits were made so that the states of the edited document may be reconstituted at any time. In such a system, any changes that are not stored in source control are deemed irrelevant.

In the prior art system of FIG. 1C, a key discriminator is that only one version of truth is allowed to exist at one time, and each version of that file requires an explicit checkin. At the time of checkin, the current version of the file is replaced by the new version of the file. Whether internally, it stores complete copies of the file or some subset of deltas is irrelevant since they represent a history only and none of those potential versions are allowed to exist at the same time along with the original baseline.

Figure 1D:
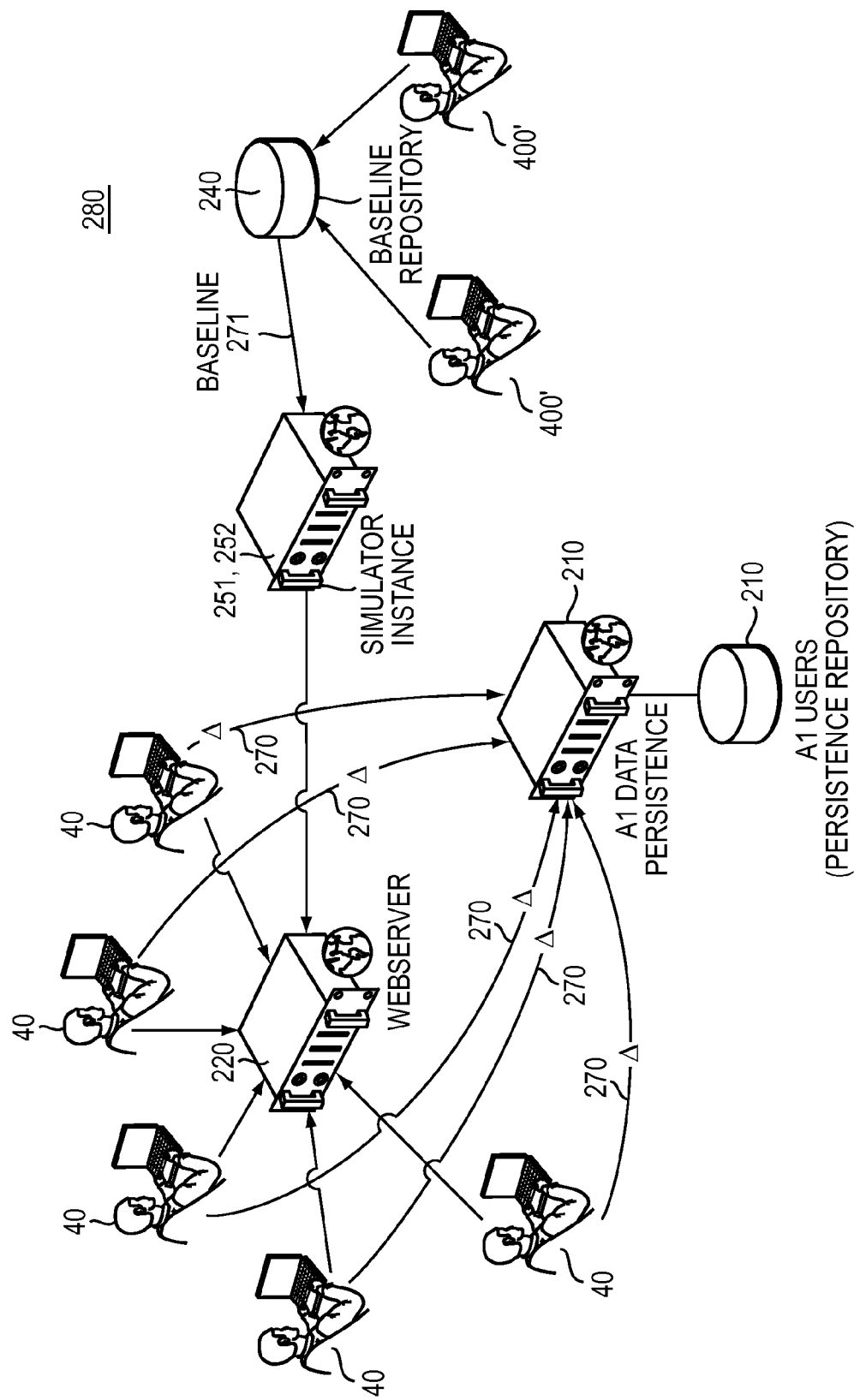
FIG. 1D is a schematic illustration of one aspect of embodiments and how it improves over FIG. 1C.

FIG. 1D is a representation of one aspect of Applicant's proposed approach and how it improves over FIG. 1C. In one proposed approach, Applicant's system 280 content (e.g., aspenONE, Trademark of Assignee) includes the baseline model files 271 which are created by desktop products of an embodiment of the proposed approach; these are stored in a network-visible location 240 that is part of an embodiment of the proposed approach but separate from the aspenONE (Trademark of Assignee) system. Access to this shared location allows for destructive editing by highly-skilled domain experts 400' who are capable of building these complex models. Instead, an embodiment of the proposed approach allows users to perform non-destructive editing. On behalf of users, a simulator (adaptor and application instance) 251, 252 reads a baseline file 271 and makes changes 270, and presents the baseline file 271 to the user 40 through a Web Server 220, but those changes are never saved back to the baseline repository 240. When a user wishes to persist the modifications to a model, the deltas 270 are taken from each user, when they initiate a save request and persist the delta information in a separate system 210 that is part of the aspenONE system (Trademark of Assignee) and associates those changes with the user 40, not the baseline repository 240. To reinforce that this differs from a simple source control paradigm, these deltas are metadata that have a stronger relationship with the respective individual user than the model. This approach is so decoupled from the model that one may take the deltas and apply them to a different model and this may be performed regularly. The source control system of the prior art does not let one do that since it does not make sense in that paradigm. The baseline models 271 are preferably never modified by the normal non-destructive users 40; directly altering the baseline model 271 is performed by a user of the pertinent desktop applications (e.g., aspenONE, Trademark of Assignee).

In some embodiments, the data path for save operations and for restore operations to data persistence, for example, data persistence 210, goes through one or more WebSockets in a WebServer 220. The WebSocket may be persistent for session. The WebSocket and may be created for web application (Web App). The Web App may provide a user interface using JavaScript or HTML.

Figure 2A:
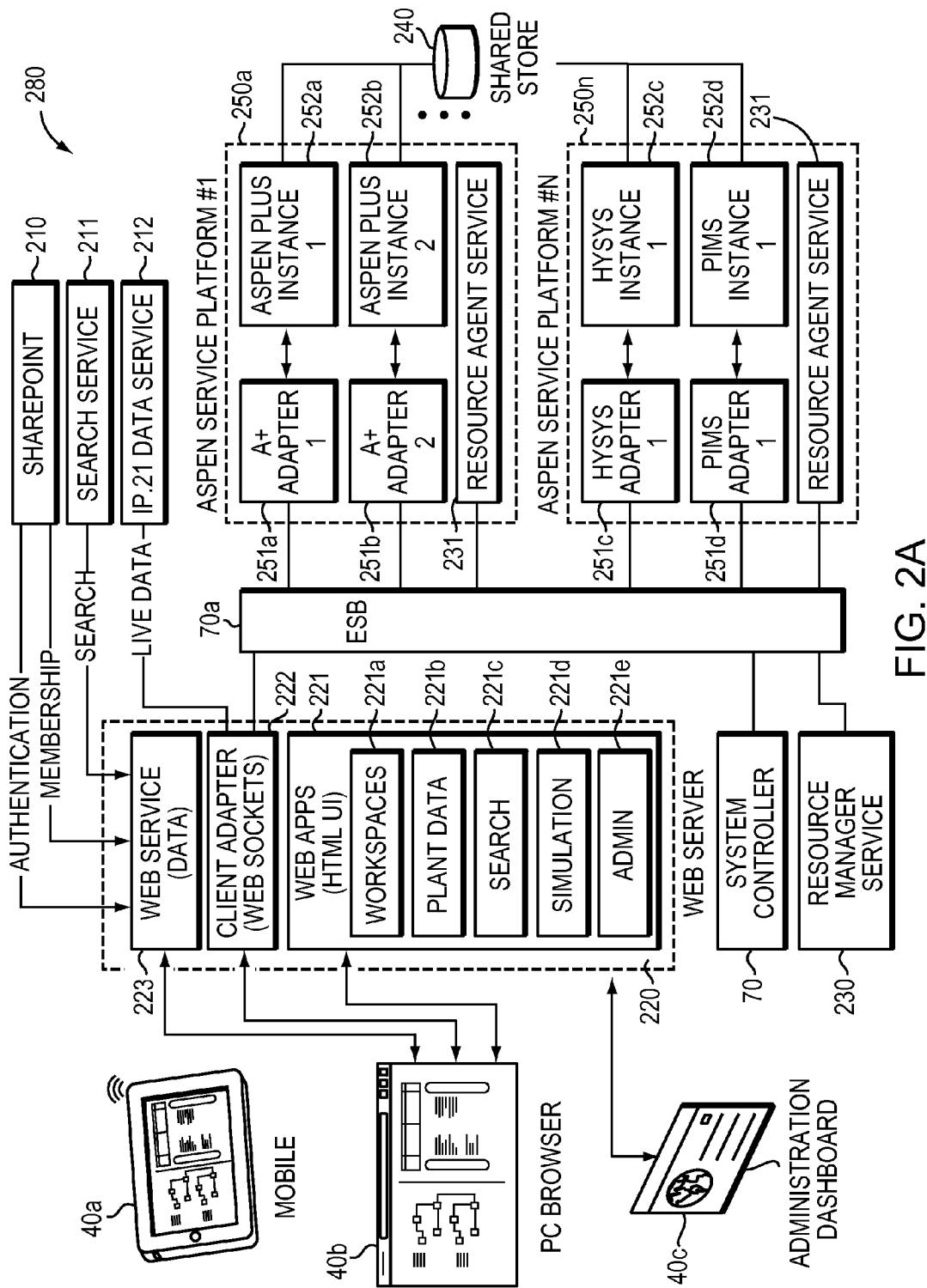
FIG. 2A is a schematic diagram of a preferred detailed architectural implementation of embodiments of the invention.

FIG. 2A is a detailed architectural implementation diagram of a preferred embodiment (system 280). Each element in FIG. 2A may be implemented in software, hardware, or both, where each element is executed through computer processing means. Each element may either be in the same geographic location, or in a different geographic location compared with other elements. In FIG. 2A, each element may be either plural or singular. For example, a system 280 includes one Resource Manager 230. On the Service Platforms 250a, . . . n, the system 280 may include any number and any combination of application instances 252a, . . . n (generally 252), e.g., Aspen Plus (Trademark of Assignee), Aspen HYSYS (Hydro Carbon Simulation System), and Aspen Process Information Management System (PIMS, Trademark of Assignee), with each application instance having a respective Adapter or Resource Adapter 251a, . . . n (generally 251).

The storage locations for each of the three model data types discussed above (270a, 270b, 271) are shown in FIG. 2A. The baseline model data 271 is stored in a Shared Store 240, the change data 270a on each "save" operation is stored in content storage 210 and locally in memory (preferably on the web server 220 but not limited to that location) associated with the simulation web application 221d which is associated with the client 40, and the change data 270b made since each "save" operation is stored locally in memory associated with the simulation web application 221d which is associated with the client 40.

Heartbeat messages include regular messages that are emitted from a source to system 280, to enable the system to identify if the source is no longer available. One example application of heartbeat messages is in Enterprise Systems. The Resource Manager 230 of FIG. 2A monitors heartbeat messages sent from each of the application instances 252 (where 252 includes at least 252a, 252b, 252c, 252d, 252o, and 252p) through an associated Adapter 251 (where 251 includes at least 251a, 251b, 251c, and 251d) through an Enterprise Service Bus (ESB) 70a. These heartbeat messages are preferably sent every minute, although they may be sent more or less frequently, such as every five minutes, or faster than one minute. Typically, heartbeat messages are sent every minute, or faster.

In the event that one or more heartbeat messages is lost, or in the event of routine maintenance initiated by an administrator 40c, the Resource Manager 230 detects the failure and takes proactive steps by initiating a corresponding service recovery event, and takes the Service Platform (250a for example) offline proactively and allocates another replacement (250n for example) from a pool of available Service Platforms 250a n. The Client Adapter 222 is notified that it needs to send the cached set of data deltas 270 to be applied to the baseline service after it has loaded the proper data and is ready to accept changes to its state. Applying the deltas 270 and baseline 271 effectively reconstitutes the state of the failed service. Referring to FIG. 2A, the Client Adapter 222 is requested to resend the changes 270 in batch form, the user is aware that a failure and subsequent recovery has occurred. This capability of an embodiment of the proposed approach also allows a user to log into a system, reconstitute a stateful service and resume work that was previously stored in a non-destructive manner.

A subject application, for example, aspenONE (Trademark of Assignee), makes use of existing Aspen Plus (Trademark of Assignee) 252a, 252b, and Aspen Aspen HYSYS (Trademark of Assignee) 252c application instances by running them as Stateful Services; an instance of the application loads, which in turn, loads a specified model. In addition, other application instances may be used as stateful services, such as, but not limited to, Aspen PIMS (Trademark of Assignee) 252d, other application instances, simulation instances, data storage instances, data processing instances, data analysis instances, or other instance types. Applying user-specific deltas 270 and the baseline 271 to the application instance 252 effectively reconstitutes the state. Since these existing software products are not originally written to function as stateful services, an advantage of an embodiment of the proposed approach is that it makes up for this deficiency and accounts for failure events. Through an embodiment of the proposed approach, the subject application, like aspenONE (Trademark of Assignee), detects and ameliorates the impact of failure events in support of the user.

Some additional implementation details that support an embodiment of the proposed approach as shown in a preferred implementation in FIG. 2A are as follows. One of ordinary skill of the art understands that alternative methods for implementing an embodiment of the proposed approach may also be used. After discussion of these implementation details, a summary discussion is provided in reference to FIG. 2B.

As shown in FIG. 2A, the preferred Content Storage 210 implementation is Microsoft Sharepoint, however, embodiments of the proposed approach may also use other user preference storage (content storage) 210 implementations in place of Microsoft Sharepoint. The user preference storage 210 is preferably used to store user profile information, authentication information, and membership information, and models, files, or other data; however, one skilled in the art realizes that other types of storage may be used to store this information. User preference storage 210 is communicated to the user through a Web Service (Data) 223 to a computer display 40 for the user, where the Web Service may optionally be included in a Web Server 220. However, in an alternative embodiment, the Web Service (Data) 223 may be replaced by the Client Adapter 222 which communicates with the ESB 70a.

The computer displays 40 (where 40 at least also includes 40a, 40b, and 40c), shown in FIG. 2A, include but are not limited to a computer monitor, personal computer, laptop, desktop, phone, smart phone, mobile phone, projection device, or other computer (digital processing or computing) device. The user is provided with Web Applications that include User Interfaces (UI) 221 that allow the user to modify a model or file and include at least Workspaces 221a, Plant Data 221b, Search 221c, Simulation 221d, and Administration 221e, where the UIs may optionally be included in a Web Server 220. The UI is implemented in Hypertext Markup Language (HTML) but alternative implementations may be used. Each user can build desired functions to create a unique combination of services instead of, for example, one software product per service. The service including an application instance running as a service may apply business logic allowing the user to choose functions and a unique combination of services to meet the user's needs. The application may allow for presentation and use application logic, which picks and chooses services and how to integrate functions for the application. In some embodiments, the UI is a graphical user interface (GUI). Workspaces 221a have a unified user interface that allows the user to store search results, store file changes, model changes, store snapshots of data, store merged views of files and models, modify files and models, and include files and models, such as, but not limited to, simulation models and application models.

A Search UI 221c allows the user to search, through a Search Service 211, for models and files. The Search Service 211 software extracts metadata from files and models and indexes that data into the search.

Optionally, sensors perform plant data measurements from plant assets and report the plant data measurements through plant data servers through, for non-limiting example, an Aspen InfoPlus.21 (IP.21, Trademark of Assignee) data service 212. The "Live Data" in FIG. 2A may correspond to plant data and may include live data, historical data, and other types of plant data. The plant data may be provided to the Client Adapter (Web Sockets) 222, where the Client Adapter may optionally be included in a Web Server 220. As illustrated in FIG. 2A, live data from the Data Service 212 and simulation data from the Enterprise Service Bus (ESB) 70a are simultaneously input to the Client Adapter 222. The Client Adapter 222 may establish two way communications. The Client Adapter 222 may reduce network traffic and latency. The Hypertext Transfer Protocol (HTTP) headers may be significantly reduced. The Client Adapter 222 may operate continuously.

The simulation model, application model, or one or more files that has both a baseline 271 and deltas 270 are received by the Client Adapter 222. The application model may include, but is not limited to, a model file or one or more files as consumed by Aspen HYSYS (Trademark of Assignee), Aspen Plus (Trademark of Assignee), Aspen PIMS (Trademark of Assignee), or other application types. The simulation model may include, but is not limited to, a combination of a baseline and a user's delta values, along with session meta-information about zoom and pan levels, which stream tables are open and the filter settings, and optionally other settings.

The Client Adapter 222, on behalf of the user, requests an available application instance from the Resource Manager 230. This request is the result of applying a Service Platform 250 to a model that the user is viewing in the Simulation Application 221d. If the Resource Manager 230 grants the request, based upon compatibility and availability, then access to an application instance 252 in Service Platforms 250 is provided, and a further request is performed through the Enterprise Service Bus (ESB) Network Element 70a which forwards to the Service Platforms 250a . . . 250n (generally 250) to obtain an application instance. Within one or more instances of Service Platforms 250, the application instance may include one or more instances of, for non-limiting example, Aspen Plus (Trademark of Assignee) 252a, 252b, Aspen HYSYS (Hydro Carbon Simulation System, Trademark of Assignee) 252c, Aspen PIMS (Trademark of Assignee) 252d, or other types of applications or simulators. Multiple application instances 252 may have the same UI or separate UIs. In addition, a Resource Agent Service 231 starts and stops Adapters 251 (where 251 at least includes 251a, 251b, 251c, and 251d). In some embodiments, the Resource Agent 231 acts as a service for the whole machine running all of the platforms 250 associated with the machine. The Resource Agent 231 starts and stops Adapters 251 when the machine starts up.

The Adapters 251 adapt application-specific settings and instructions between software languages. The Adapters 251 are also used to provide a connectivity mechanism to the ESB 70a for a given instance of a simulator/application 252. Adapters 251 control the application instance 252 running as a service and handles communication between the application instance 252 running as a service and the Client Adapter 222, the Resource Manager 230, and the corresponding Resource Agent 231 as shown in FIG. 2A. When the application instance 252 and the corresponding Adapter 251 are activated, then data such as models, files, or other data from the shared store 240 may be transferred through the ESB 70a to the Client Adapter 222. Once an application instance 252 is established, the Client Adapter 222 has exclusive access to the application. Note, multiple applications may be used, such as Aspen HYSYS (Trademark of Assignee) and Aspen Plus (Trademark of Assignee), but this fact is transparent to the user. Based on request parameters and/or other input from Resource Manager 230 and Client Adapter 222, the system 280 knows which type of application is required and automatically interacts with the correct one. In some embodiments, if a deployment or service platform 250 does not have a specific simulator or application installed, the specific simulation or application service is preferably not seen in the dynamic service bar or other user-selectable menu/part of the user interface 221. The Service Platform 250 sends replies and other messages to the Client Adapter 222 that the application 252 publishes for the client 40 to read. The Service Platform 250 may provide push notifications from the Services or Application Instance 252 running as a service. The Service Platform 250 may provide smaller, faster, and more focused messages.

Note that data from the shared store 240 may include any user-driven data meant for sharing, including but not limited to files or models. Note that both the Service Platforms 250 and the data from the shared store 240 are not limited to simulation, and other types of applications 252 using other types of Service Platforms data from the shared store 240 may be used, such as, but not limited to, files, models, application models, process control, planning, scheduling, manufacturing, accounting, manufacturing supply chain (MSC) products, supply chain logistics, anything that requires automation in a plant or process, anything that performs processing of crude oil, or other types. In addition, as shown in FIG. 2A, multiple service-platform instances (modules) 250 may be used and multiple application instances 252 may be used. Example Applications include Aspen Plus (Trademark of Assignee) 252a, 252b, and Aspen HYSYS (Trademark of Assignee) 252c each provide a comprehensive process modeling system, and Aspen PIMS (Trademark of Assignee) 252d provides a planning and optimization solution.

Figure 2B:
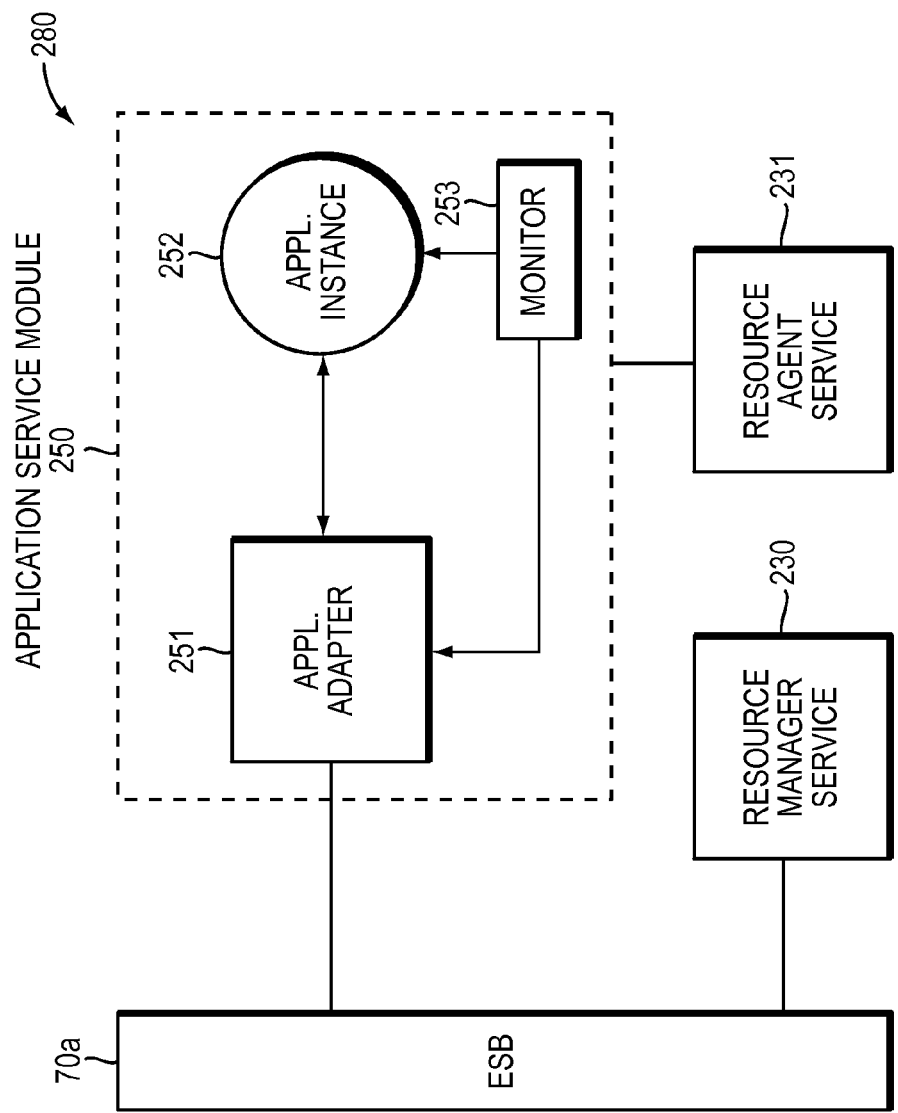
FIG. 2B is a schematic illustration of a monitor associated with the Service Platform module of FIG. 2A embodying the present invention.

Note also that the Service Platform or service module 250 may also include both the respective Adapter 251 and the corresponding Application Instance 252 and may optionally include a Monitor 253, which is started by the Adapter 251, as shown in FIG. 2B. The monitor 253 may monitor both the application instance 252 and the Adapter 251. The monitor 253 may detect failures from either or both the Adapter 251 and application instance 252, thereby serving as an additional self-healing mechanism. The monitor 253 in the case of a failure being detected in the Adapter 251 may kill (cease) the application instance 252 and itself. The monitor acts as a safety to prevent rogue threads, for example, an application instance 252 when its adapter 251 dies.

The Adapter 251 initiates and controls the corresponding Application Instance 252 and optionally a Monitor 253, as shown in FIG. 2B. In embodiments, the monitor 253 ensures the Adapter 251 does not die prematurely and leave the application instance 252 as an orphaned or rouge thread. The monitor 253 may monitor both the application instance 252 and the Adapter 251. The monitor 253 may trigger a switchover event in the case of a failure being detected in the Adapter 251.

Referring back to FIG. 2A, the application instance 252 has access to the Shared Store of simulation model information 240, so the Client Adapter 222 may retrieve simulation data. The Resource Agent 231 runs locally on a Service Platform server or on the service tier machine (that supports 250). The Resource Agent 231 starts and stops Adapters 251 (where 251 at least includes 251a, 251b, 251c, and 251d) based on configurations and commands, which may be changed at least at runtime. At startup, the Resource Agent 231 reads its configuration and starts the appropriate number of Adapters 251 which may be implemented as Application specific Adapters. The Adapters 251 may be implemented as Aspen HYSYS (Trademark of Assignee) Adapters, Aspen PIMS (Trademark of Assignee) Adapters, Aspen Plus (Trademark of Assignee) Adapters, and/or other types of Adapters. The Adapters 251 initialize and register with the Resource Manager 230. In some embodiments, the Adapter registration is dynamic based on the instructions received by the Resource Agent 231. The Resource Manager 230 is visible system-wide and may not know the physical location of each adapter 251. The Resource Agent 231 has a responsibility to kill/terminate (stop) any adapter 251 and thus application instance 252 process (if tasked by the administrator) to keep the machine clear of hanging, slowing, or otherwise misbehaving service threads, or for other reasons. In one embodiment, the "Application" Service Lifecycle is designed to mimic the Desktop Lifecycle, although one skilled in the art may realize that other computer lifecycles may be used. As such, the Resource Adapter 251 is a proxy for the desktop user and starts and stops the respective application instance 252 to help ensure stability and to guard against side-effects. The Resource Adapter 251 is also referred to herein as a proxy, a smart proxy, and an adapter, and it is described in more detail below.

The following is a further explanation of Resource Management of system 280 from the Client View (generally at 40). To a system client 40, there is a mechanism for sharing a limited set of resources across a group of people where access is exclusive for the period of time that it is in use depending on availability. For example, the system 280 may be configured to have a specific number of simulators 252 available, which depends on the topology or structure and hardware deployed for the whole system or network. The topology may be distributed. In embodiments, a master copy of the simulator may exist. The master copy acts as a template, which may be copied to a local directory. All enterprise users may share the pool of simulators, and if a simulator is available, a user may "check out" or use a specific copy of the simulator. No two enterprise users will be using the same simulator simultaneously or at the same time, so a user's use of a specific copy of the simulator is exclusive during the period of check out. In some embodiments, the service such as a simulator may be dedicated to the user and retain memories of user needs, tasks, events, etc. of a stateful service session. In some embodiments, the resource 252 may be assigned to another resource or process. For example, a scheduling service may be used to bind an application instance 252 through its Resource Adapter 251 for use at a particular time. In some instances, all simulators (resources) 252 available in a given system are deployed or checked out so that none are available at that moment in time to a user. For example, the system and process of Resource Management of 280 works a lot like bowling. In order to bowl, a user needs shoes. Shoes are limited resources that require exclusive access; while the user is bowling, no one else may use shows that he is using. A representative assigns a pair of shoes in exchange for something a user wants back, like a driver's license (or system tokens in embodiments of the present invention). When the user finishes, the user returns the shoes to a trusted third party, and after some housekeeping, the shoes (a resource) become available again and someone else may check them out. In the system Web Application 221, the trusted third party is the Resource Manager 230, and the Resource Manager 230 oversees a system that is a bit more complex. Like a taxi cab dispatcher, the Resource Manager 230 knows how many cabs (resources/application instances 252) are available, how many have riders and how many are "out of service."

The Resource Manager 230 also monitors compatibility. Compatibility implies that a given service or resource somehow enhances the existing work, such that new value is created or existing value is released. Compatibility and availability tell a user what services or resources "could be applied" to current work, providing that it is available. For example, as pieces or modules are added to the Service Platform module 250, the new piece or module may include additional services, resources, and applications not previously available. Such systems are dynamic and may easily adjust if there are problems. An advantage of the Resource Management system includes its dynamic nature due to the modularity of the system 280. The Resource Management system of 280 is also configurable.

Figure 3:
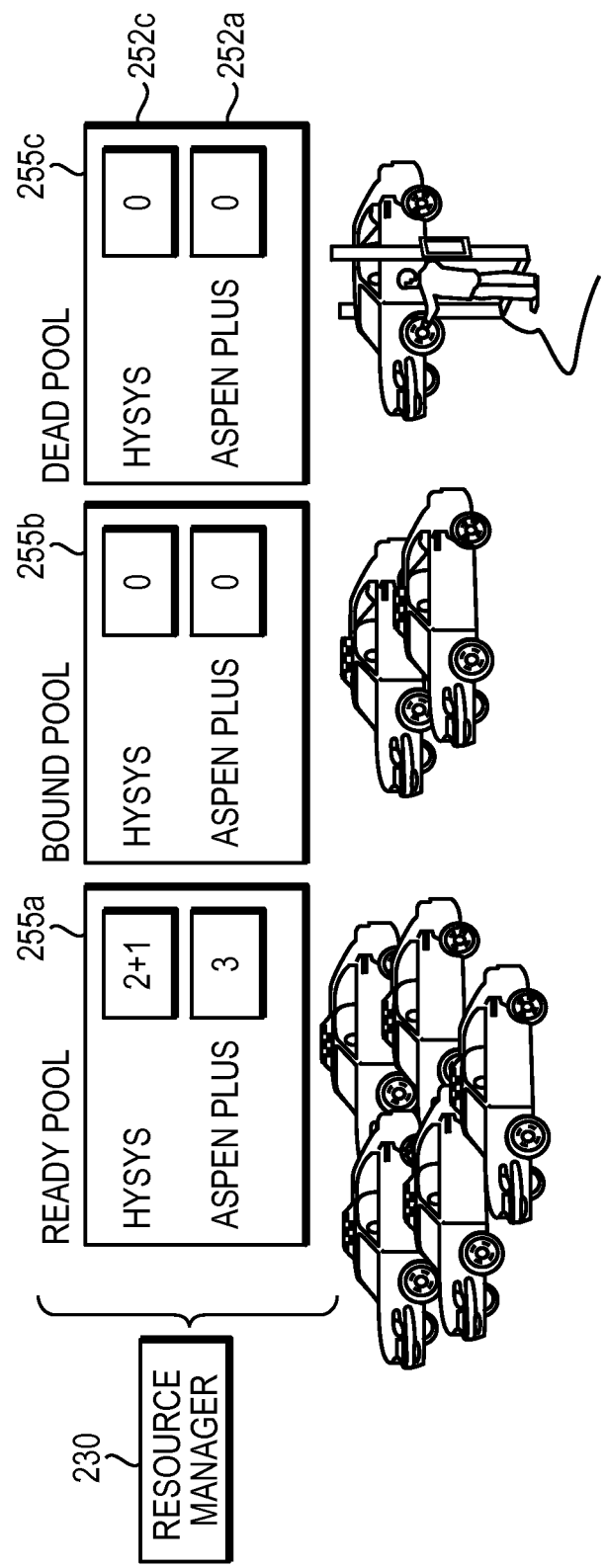
FIG. 3 illustrates a preferred embodiment of resource pools used by the present invention.

As shown in FIG. 3, the Resource Manager 230 manages a pool of resources that includes three classes of resource pools, a Ready Pool 255a, a Bound Pool 255b, and a Dead Pool 255c. The Ready Pool 255a includes application resources 252 that are available but not yet in use, the Bound Pool 255b includes application resources 252 that are in use, and the Dead Pool 255c includes application resources 252 that are considered removed or otherwise defunct. Each resource pool class may be also considered as a state. Preferably, a resource 252 may transition from a ready state to a bound state, from a bound state to a ready state, and from either a bound state or ready state to a dead state. For example, when the Resource Manage 230 checks for the availability of a Resource Adapter 251 associated with a requested resource (Application Instance 252), the Resource Manager may check the Ready Pool 255a. However, in alternative embodiments other state transitions are allowed for resources 252.

Referring back to FIG. 2A, the Resource Adapter 251 is a smart proxy and handles all system interaction on behalf of the Application Instance 252. For example, upon initialization, the Resource Adapter 251 registers the Service with the Resource Manager 230. In embodiments, the Resource Adapter 251 lets the Resource Manager 230 know that the Resource Adapter 251 is available to work if needed, and the Resource Adapter 251 runs as a lightweight proxy waiting for a call when not actively servicing requests. By running the Resource Adapter 251 rather than running a Service 250 in perpetuity, the system 280 has greater stability. Software, application instances, and services can have problems, especially instability, when they are constantly running. The Resource Adapter 251 may have a lifespan of the lifetime of the system 280. The Application Instance 252, which is run as needed, may have a lifespan corresponding to the time of binding and starting until the time of release and stopping. The Resource Adapter 251 controls the lifespan of the Application Instance 252 running as a service by starting and stopping the Application Instance 252 as needed. The Resource Manager 230 preferably does not require a priori knowledge of the Adapter 251. This high level of decoupling makes a system 280 very dynamic and scalable.

The Resource Adapter 251 preferably services user requests after it has been assigned to a specific client 40; the assignment process is called "binding" and includes a binding identification or binding ID that drives dynamic routing. The binding ID is held by both the client 40 and the Adapter 251. A bound Resource Adapter 251 begins to receive user requests for processing and spins up an instance of the application 252, which checks out tokens. As with any other System Service 250, the Adapter 251 publishes responses, System Events and Notifications via messaging.

The Resource Adapter 251 functions as a proxy for the Service 250 and when not actively servicing requests, the Service 250 instance preferably does not exist. When the Application Instance 252 is brought into being by Adapter 251, communication may occur via a Case Execution Service (CXS). This pattern allows the Resource Adapter 251 to continue to participate in Automation, System Management and Administrative functions. The Adapter is a stand-alone system component, and like all components, it preferably provides regular status reports even if there is no application 252 currently running Once connected to the messaging backbone, which is a component of ESB 70a, the Resource Adapter 251 provides Service Access 250 by receiving requests, publishing events, responses and notifications on behalf of itself and the application instance. Adapter (251)/ Application Instance (252) communication may occur via CXS which includes but is not limited to, an application programming interface (API). The Adapter 251 may include control logic and may send commands through the CXS to the Application Instance 252 to load, run, query, or otherwise handle the model. The messaging backbone may use the Advanced Message Queuing Protocol (AMQP). Other communication services, protocols and programming languages may be used to implement the System messaging backbone.

Figure 2C:
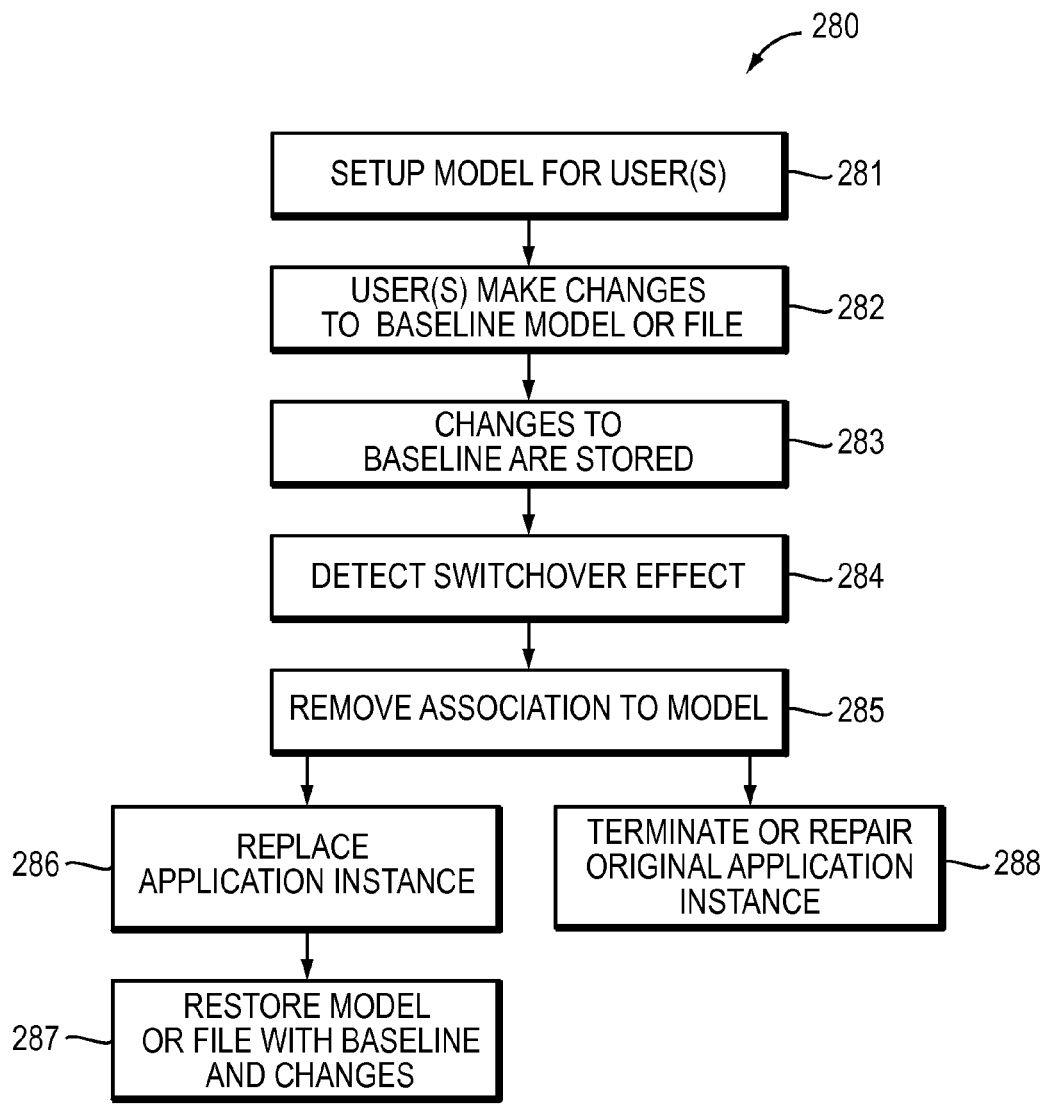
FIG. 2C is a procedural flowchart for model fail recovery in embodiments of FIG. 2A.

Now that context of architectural elements and related terminology is described for FIG. 2A, a summary of a model failure recovery or session migration is provided in FIG. 2C. FIG. 2C is used for an illustration of the primary steps of an embodiment/system 280 of an example approach.

In step 281 of FIG. 2C, the model (simulation model, application model, or one or more files) is setup for a given user. Initially, a baseline model 271 is added to the shared store 240, or the baseline model 271 is pre-existing in the shared store 240. The Client Adapter 222 requests a resource from the Resource Manager 230, the request is granted, an associated application Adapter 251 is added to the bound pool, a binding ID is assigned from the Resource Manager 230 and held by the Client Adapter 222 and the Adapter 251. An associated application instance 252 is established by a command from the Adapter 251. Each application instance 252 is paired with an Adapter 251 that controls the application instance 252 and handles communication between the application instance 252 and the Client Adapter 222, the Resource Manager 230, and the corresponding 231, as shown in FIG. 2A. The Adapter 251 is between the application instance 252 and the Client Adapter 222, Resource Manager 230, and the Resource Agent 231, as shown in FIG. 2A. A bi-directional traffic communication path from the Client Adapter 222 to the application instance 252 is established through the ESB 70a connected to an Adapter 251 that is coupled with the application instance 252 as shown in FIG. 2A. The Resource Manager 230 allows this bi-directional traffic communication path, thereby allowing an association between the application instance 252 and the model 271 at the Client Adapter 222. In a preferred embodiment, bi-directional traffic between the Client Adapter 222 and the application instance 252 passes through the Resource Manager 230, and the Resource Manager 230 acts as a gate for the bi-directional traffic, thereby allowing an association between the model at the Client Adapter 222 and the application instance 252. The application instance 252 retrieves the baseline model 271 from the shared store 240 and delivers this model for viewing to a given Client Adapter 222 through a given user interface 40.

In step 282, one or more users, each on different Client Adapters 222, each make different changes 270 to the same baseline model 271 through either the same or different user interfaces 40. One or more users may make changes through a given user interface 40 and a given Client Adapter 222, multiple user interfaces 40 with a single Client Adapter 222, or multiple user interfaces 40 with multiple Client Adapters 222. One or more users may have access to the same baseline model 271 either through the same application instance 252 or different application instances (252a and 252c for example).

In step 283, changes are saved. In an alternative embodiment, the baseline 271 may be modified directly and saved to the shared store 240 with changes. However, in a preferred embodiment, the baseline 271 is preferably not modified in the shared store 240. For a given user, the first set of changes 270a to the baseline model is saved, upon a save operation, to a user-authenticated user preference storage 210 (also known as content storage) and locally within the simulation web application 221d on the web server 220 (and preferably to hardware memory on the web server). For a given user, a second set of changes 270b is saved locally to the simulation web application 221d, including any changes made since the last save operation. Multiple changes 270a, 270b, may be saved for either individual users or multiple users, using the same or different user preference storage 210 and the same or different Client Adapter 222 and the same or different user interfaces 40. In the preferred embodiment of the invention, changes are private and a given user may not overwrite the changes of another given user. In another embodiment, a single user or multiple users may merge changes, share changes, and share copies of changes, where changes include single changes, multiple changes, single sets of changes, or multiple sets of changes, including both changes 270a saved through one or more save operations, and changes 270b since the one or more save operations. At a given user interface 40, a given user may view another set of the given user's changes, or view another user's changes (both changes 270a and 270b) and choose to merge zero or more of these changes. In an alternative embodiment, a user may also store changes to a baseline model, directly to the shared store 240, although saving changes to shared store 240 is not the preferred approach.

In step 284, the Resource Manager 230 listens for, and detects a loss of periodic heartbeat message from an application instance 252, triggering a switchover event (which may include a failover event) that identifies the application instance 252 as a suspect or failed application instance for removal. Reasons for a switchover event include, but are not limited to, failover, loss or delay of one or more heartbeat messages, proactive failure detection, regular, routine, or non-routine maintenance, through an administration dashboard 40c either manually through a user or through an automatic process, or through a combination of automatic process and manual intervention. A switchover event may also result through other means, or other suspicious behavior detected by the Resource Manager 230 as reported to the Resource Manager 230 in the form of software messages or hardware control signals across the ESB 70a. A switchover event may also result from an optional interrogation command sent from the Resource Manager 230 to the application instance 252 and then the Resource Manager 230 fails to receive a corresponding expected acknowledgement from the application instance 252.

Additionally, in step 284, the Resource Manager 230 may detect one or more switchover events either simultaneously or at different times. The Resource Manager 230 uses the associated binding ID(s) and identifies any potentially suspect or failed application instance(s) 252 for subsequent repair or removal. In one embodiment, a monitor 253 is connected to each Adapter 251/application instance 252 pair, and the monitor monitors both the application instance and the Adapter and the monitor may detect failures from either or both the Adapter 251 and application instance 252, thereby serving as an additional self-healing mechanism. The monitor 253 triggers a switchover event in the case of a failure being detected. The monitor 253 may be implemented as a transient thread object created by the Adapter 251, to watch the Adapter 251 and the instance 252 that it created, or, alternatively, the monitor 253 may be created by other means. The monitor may exit after completing its monitoring task. In another embodiment, detection is achieved, and a corresponding switchover event is achieved, through an Adapter 251 which determines suspect behavior within itself or within an associated application instance 252, for example, if a the associated application instance 252 is unable to start up successfully, and the Adapter communicates the failure to the Resource Manager 230 and either takes itself offline or attempts to restart the application instance. In the event that the Adapter 251 takes itself offline, the Resource Agent 231 recognizes the Adapter going offline, and restarts a new Adapter because the Resource Agent 231 ensures that the number of running Adapters matches a configuration.

In step 285, for each given failed application instance, the system 280 removes the association between the model and the application instance (for example 252a). As mentioned earlier, the Resource Manager 230 acts as a gate allowing an association between the model at the Client Adapter 222 and the application instance 252. In step 285, the association between the model at the Client Adapter 222 and the identified failed or suspect application instance (for example 252a) is removed, through the Resource Manager 230. Furthermore, when a switchover event is detected, the Resource Manager 230 sends commands to the respective corresponding Resource Agent 231 that it is taking a given Adapter 251/application instance 252 pair out of the resource pool. In a preferred embodiment, in a following parallel step 288, the Resource Agent 231 attempts to repair, kill, or kill and restart the failed application instance.

In step 286, the system 280 selects a replacement application (for example 252b with associated Adapter 251b) to replace the identified failed application instance (for example 252a with associated Adapter 251a): this is one method of self-healing. The Resource Manager preferably uses the same binding ID for the new application instance (for example 252b) as was used for the failed application instance (for example 252a), and the client 40 is unaware of the seamless restoration process. In alternative embodiments, a different binding ID is used. In a preferred embodiment, the original application instance 252a is killed and restarted for future use (self-healing) in step 288, and in parallel in step 286 the Resource Manager 230 switches the client 40 over to a new Adapter 251b/application instance 252b pair from the ready pool to avoid delays impacting the user for restarting the application instance 252a.

Additionally, in step 286, in one embodiment, the Resource Manager 230 initiates a seamless migration sequence, whereby the model is restored to a new replacement application (for example 252b) and an associated Adapter (for example 251b) without any disruption, interruption, modification, or negative effect to the given user's live service session. The seamless migration sequence involves replacement to the client 40 with a new application instance (for example 252b) and removal of a suspect application instance (for example 252a). The seamless migration sequence includes, but is not limited to, session replication, mirroring, redundancy, or redundant mirroring for application instances 252, including, but not limited to, a plurality of Adapter 251/application 252 pairs. The step 286 process results in a new application instance (for example 252*b*) available which replaces the failed application instance (for example 252*a*). In an alternative embodiment, an application instance repair or a kill and restart is performed as part of step 286, for example, if no additional Adapter 251/application instance 252 pairs are available.

In step 287, now that the given replacement application (for example 252*b*) is setup, the given model is restored into the new given application instance (for example 252*b*) and the new given application instance with the given model allows access to the user client 40. The client 40, which is disassociated with the original failed application instance (for example 252*a*) due to step 285, is now associated with the new replacement application instance (for example 252*b*), as allowed by the Resource Manager 230 (which acts as a gate as described above). Furthermore, for a given user, the model (or file) is restored by retrieving the baseline 271 from a shared store 240, retrieving the changes or set of changes due to the save operation(s) 270*a*, from the user preference storage 210 or storage for the web server simulation web application 221*d*, and retrieving the changes or set of changes since the save operation(s) 270*b* that are stored on the client 40 and locally in the web simulation application on the web server 221*d*. If the client 40 has shut down and restarted, for example, in a scenario where a user logs off at one physical location, and logs on at another physical location at a later time, then the changes 270*b* are restored from the user preference storage 210, the baseline 271 is restored from the shared store 240, and the baseline 271 and changes 270*b* are restored both to the new application instance (for example 252*b*) and to the client 40. If the local client 40 is still running, then the changes 270*a*, 270*b*, are restored from the simulation web application 221*d*, and the baseline 271 is restored from the shared store 240, and the baseline 271 and changes 270*a*, 270*b* are restored to the new application instance (for example 252*b*) and the baseline 271 is restored to the client 40. The restoration occurs through a restoration procedure initiated by the Resource Manager 230.

Next, in step 288, the Resource Agent 231 chooses to repair, kill/terminate (preferably), restart, or kill/terminate and restart the failed application instance while the Resource Manager 230 selects a new application instance. When the Resource Agent 231 decides, then it notifies the Adapter 251 to perform the repair, termination (preferable), restart, or kill/terminate and restart. If the Adapter 251 is unavailable or unresponsive, the Resource Agent 231 may notify the monitor 253 to terminate the application instance 252. In step 288, when the Adapter 251/application instance 252 pair is successfully repaired or restarted then it re-enters the Resource Manager's ready pool, and this repair and restart is done in parallel with (asynchronously from) the Resource Manager 230 obtaining the new application instance (for example 252*b*) in step 286. In a preferred embodiment, repair is not attempted and replacement is performed. In an alternative embodiment, the original application instance (for example 251*a*) is killed and restarted, so the new application instance 251*a* is associated with the same Adapter 252*a* as the original application instance 251*a*, and has the same Adapter 251*a*/application instance 252*a* pair as the original application instance.

Embodiments of the present invention provide a method and an apparatus of a Resource Adapter 251 or smart proxy to communicate between the application instance 252 and the Service Oriented Architectures (SOA). Use of smart proxy (Resource Adapter) 251 binding enables the use of desktop application software for the purpose of creating pools of desktop applications that provide stateful behavior in distributed software architectures. The smart proxies or Resource Adapters represent allocated application instances and initiate the application software on-demand as needed. Pools of smart proxies (Resource Adapters) make it possible to develop dynamic on-demand services based on desktop application code that bind individual smart proxies and their attendant instances to specific clients as they request them, such that the instance can be expected to maintain its state over multiple invocations from the same client. This is accomplished through the use of a Resource Manager 230 to broker the binding and to route the messages, a smart proxy, also referred to as a Resource Adapter, to start and stop the application instance and a local resource agent to start and stop the smart proxy.

The invention addresses one of the biggest challenges for migrating desktop software into Service Oriented Architectures; the challenge is that the software is often designed and coded to run on a single thread and to service the needs of a single user. As such, desktop applications are in conflict with even the simplest definition of a Service which is stateless and engineered to run in perpetuity once it is started.

In some embodiments, the SOA is multithreaded, i.e., contains one or more threads. In embodiments, the services may be run in a serial sequence or in a parallel sequence (multithread). In example embodiments, the application instance 252 is multithreaded. In example embodiments, the infrastructure of the Service Platform 250 and architectural implementation of one or more components are multi-threaded to increase and to maximize flexibility and performance. For example, Web Application 221 may be multi-threaded.

It is possible to create a hybrid architecture that allows the application to have the stateful lifecycle that it was designed for (the single user), while still operating within the context of a normally stateless system such as a service. A Resource Manager 230 component is created that serves multiple functions. Some Resource Manager functions include tracking all Adapters 251 that register with it, listening for Adapter regular heartbeat/status messages to detect situations where and Adapter needs to be taken offline proactively, and allocating the limited resources available and that interact with a smart proxy (Adapter). The smart proxy is also referred to as a Resource Adapter since it adapts the native interfaces of the application to the common message-based infrastructure of an Enterprise SOA. The Resource Manager 230 and the Resource Adapter 251 function more like a standard message-based service. Since the client 40 does not have direct access to the Smart Proxy/Adapter 251, the Resource Manager 230 forwards any client messages to the Adapters 251 based on mapping information provided by the Adapters when the Adapters are initially registered. The Resource Manager functions as a System Service, and the Resource Adapter 251 functions as a service that handles client 40 requests. Both the Resource Manager 230 and the Resource Adapter 251 may leverage the Platform Service 250 system messaging backbone.

In embodiments, for example, FIG. 2B, the Resource Adapter 251 is a smart proxy in that it also doubles as a placeholder for the application instance 252 that does not yet exist. In example embodiments, the smart proxy 251 is also a token that is used for resource management 230 such that its very existence is meaningful. As part of initialization, the Resource Adapter announces or introduces itself to the Resource Manager via registration and is not generally known to the system 280. In embodiments, the Resource Manager has no knowledge or expectations about the Resource Adapters that may decide to register; this keeps the mechanism loosely coupled and dynamic. In some embodiments, the message bus (ESB) 70*a* decouples modules from clients 40 to keep the system 280 dynamic and scalable. Clients, who want an application assigned to them for their exclusive use, can contact the Resource Manager with a binding request. If a check of an internal pool of smart proxies shows that one is available, a binding ID is generated and the binding notification is sent to both the Adapter 251 and the client 40. In example embodiments, the Resource Manager 230 works as a match maker.

Figure 6:
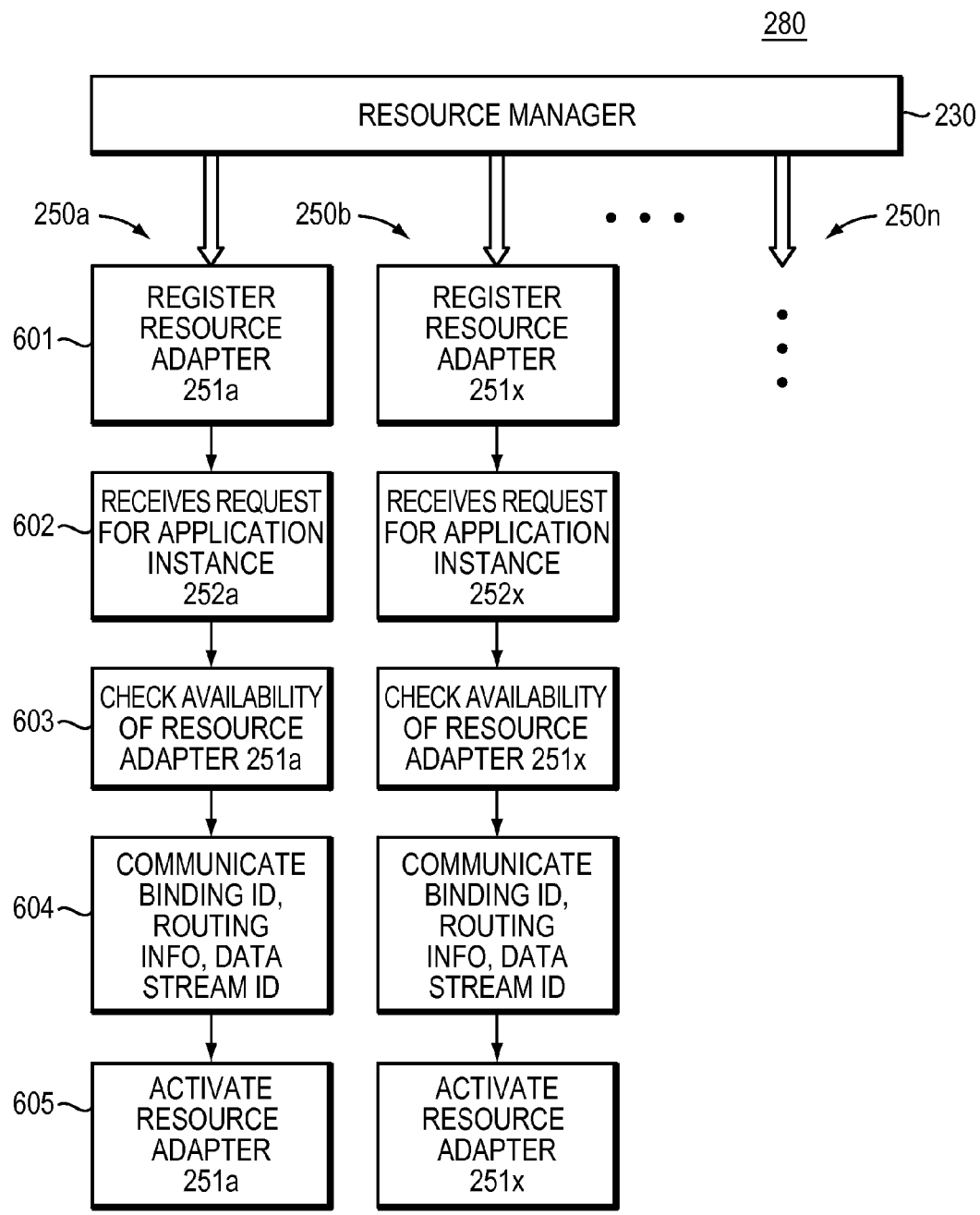
FIG. 6 is a procedural flowchart of managing resources in embodiments of the invention.

In an embodiment of the invention system 280 depicted as a high level architecture in FIG. 6, the Resource Manager 230 manages multiple resources, for example, Service Platform modules 250*a*, 250*b*, 250*c* . . . 250*n* (generally 250). Initially, at step 601, each Resource Adapter 251 registers with the Resource Manager 230. At step 602, a specific resource such as an application instance 251*a* coupled to a Resource Adapter 251 is requested from the Resource Manager 230, for example, by the Client Adapter 222. In some embodiments, the Client Adapter 222, in the WebServer 220 requests a resource from the Resource Manager 230 because the Client Adapter 222 needs to load and run an application, for example, a modeling application. If the requested application instance 252, for example, 252*a*, represented by the corresponding (or associated) Resource Adapter 251 for example, 251*a*, is available at step 603, the request is granted by the Resource Manager 230. The Resource Manager 230 communicates to the Resource Agent 231, and the application instance 252*a* associated Resource Adapter 251*a* is removed from the ready pool 255*a* and added to the bound pool 255*b* (FIG. 3). If the requested resource is not available, the Resource Manager denies the Client Adapter's request. The Client Adapter 222 may then use turn-taking and wait for an available resource.

At step 604, a binding identification is assigned from the Resource Manager 230 and held by or communicated to the Resource Adapter 251*a* (and, in some embodiments, to the Client Adapter 222). At step 604, in addition to the binding identification, information including additional routing information and data stream identifiers may also be communicated between the Resource Manager 230, Resource Adapter 251, Client Adapter 222 and other components of the system. The Resource Adapter 251 may provide a location to the Resource Manager 230 (and, in some embodiments, to the Client Adapter 222) where the Resource Adapter 251 may post all responses to commands and requests for information including data so that a conversation and communication between components can be established. The designated location may be derived dynamically, and the Resource Manager 230 (and, in some embodiments, to the Client Adapter 222) may listen to the message stream to complete the full circle of communication. The communication of the binding identification leads to the activation of Resource Adapter 251*a*, at step 605, through the Resource Agent 231, and a binding allows for exclusive use of the resource such as the application instance 252*a* by a user at 40. An associated application instance 252*a* can then be established or activated by a command from the Adapter 251*a*. A resource such as an application instance that is checked out and running may consume license tokens. In embodiments, the Resource Adapter 251 acts as a lightweight proxy that will launch respective associated application instances only as needed, which may minimize consumption of resources and computing power. While the resource such as an application instance is exclusively checked out to the user, stateful information keyed to previous user tasks and needs may be called into the application instance. As discussed above, each application instance 252 is paired with an Adapter 251 that controls the application instance 252 and handles communication between the application instance 252 and the Client Adapter 222, the Resource Manager 230, and the corresponding Resource Agent 231, as shown in FIG. 2A.

It is the responsibility of the Resource Adapter 251 to start up (launch) and shut down (terminate or kill) the corresponding (or associated) application instance 252 and to handle all interactions between the running application instance and the system 280. In some embodiments, the Resource Adapter 251 manages all communication, for example, via messaging and CXS, calling or asking the application instance to do work. In embodiments, the Resource Adapter finds the model and copies the model to a local directory for the application instance to work, so the model may be treated as a local file. In particular embodiments, the application instance works with a copy of the model rather than the original model in order to ensure non-destructive editing. In embodiments, the Adapter 251 creates a temporary working directory with a copy of the model so that the application instance can easily do its work and so that the copies are easily removed (cleaned up afterwards, so nothing gets left behind). In embodiments, the Resource Adapter also reports its status at regular intervals (emits status messages) and emits messages in response to service requests. In embodiments, the Resource Adapter mimics the "user" of an application. The Resource Adapter may work from a local directory and treats the copy of the model as a local file.

In some embodiments, a secondary process (a monitor) 253 in the application instance 252 may run to monitor the Adapter 251. In the event that the Adapter 251 dies, the monitor 253 terminates the running application instance 252. In embodiments, the monitor 253 monitors (runs a monitor process of) the state of the Resource Adapter 251 and optionally the state of the application instance 252. In embodiments, the monitor is a small companion process that is launched after the launch of the application instance, and the monitor guards against rogue threads. The monitor 253 is given the process identification, which is assigned by the operating system to any process, of both the Adapter 251 and the application instance 252. The Monitor 253 holds or stores the process identification of the application instance and the process identification of the Adapter after the application instance runs. In some embodiments, the monitor can stop, kill, end, or terminate based on each process identification and can stop, kill, end, or terminate itself. In example embodiments, upon detection of failure from the Adapter 251, the monitor 253 terminates the application instance 252 and itself.

All Client request messages go through the Resource Manager 230 and include the binding ID which is used to route traffic to the bound Resource Adapter 251. When the Client 40 is finished, it can release the resource and the associated Smart Proxy/Resource Adapter 251 responsively shuts down the running instance, thus completing the application's lifecycle.

This Service Paradigm achieves Stateful Service Behavior in what is normally a stateless system. These approaches are not mutually exclusive in that a given architecture can easily support both Stateful and Stateless Services in the same SOA architecture. A stateless service does not maintain any client-specific state. In embodiments, a stateless service allows one instance 252 of a stateless service to serve multiple clients 40 simultaneously without a context switch involving moving data in and out of the service depending on the identity of the client. For example, a stateless service starts from default values without memory or context linked to the user or to the client. In embodiments, some state information, for example, tables and other cached data may be necessary to allow the service to function as designed but may not directly relate to any specific client.

In some embodiments, the resource agent 231 launches the Resource Adapter 251 with configuration information achieving stateful service behavior. A stateful service involves stored information of variables and data from applications 252 at a given time point that may be linked to a specific user. A stateful method or apparatus involves remembering one or more preceding events in a sequence of interactions with a user, another computer, or other outside element. In some embodiments, the stateful service is configured to act like a dedicated service based on a specific user, for example, a user's needs, preferences, and tasks. In some embodiments, the stateful service involves binding certain information to a specific user, for example, information tied to a user's account based on a user's login information to access a system. A stateful method, apparatus or service can be dynamic. In embodiments, the Resource Adapter 251 gets or retrieves configuration information and uses the information to populate parameter values for a stateful service session. In example embodiments, the Resource Adapter 251 uses AXML for a method to call for a stateful application instance with parameter values. In embodiments, viable message formats are used to call for information such as parameter values for the system 280. In embodiments, the information for the system is in extensible markup language (XML) or AXML representing differences from default values.

Finding ways to continue to leverage the value locked up in desktop software is a common challenge among mature software companies in a world where more and more people are working away from a desk. Service Oriented Architectures provide the freedom to create controlled service environments that mimic the usage for which the software was initially designed. In some embodiments, for SOAs to mimic individual software usage, the User Interface may be bypassed with the ability to trigger code paths programmatically. In other embodiments, the ability to trigger code paths programmatically is integrated with the User Interface. In embodiments, the SOAs mimic individual software usage by triggering code paths programmatically and by retrieving the results from that processing to tie that access to a system that can drive that program logic from alternative interfaces.

In the case of aspenONE (Trademark of Assignee), the responsibility of starting and stopping the application on demand is handled by a software process called a Resource Adapter 251; when a user needs to run an aspenONE (Trademark of Assignee) simulation, the Resource Adapter starts an instance of either Aspen Plus (Trademark of Assignee) or Aspen HYSYS (Trademark of Assignee) and gives it commands like "load this model file, run the model and give me some results." In some instances, simulators may not be available. In embodiments, aspenONE (Trademark of Assignee) has a Resource Manager that keeps track of the fixed number, e.g., fifteen, of simulators available, bound and in use, or dead. The Resource Manager can then track, for example, all fifteen simulators with multiple instances 252 running simultaneously. Regardless of the number of tasks and processes occurring in the system 280 or service platform 250 infrastructure, an individual user generally is presented with a view, for example through a user interface 40, as if the entire system or service platform belonged to the user. The user may experience limitations to what the system may allow the user to do. For example, the user may not be able to modify all variables or components depending on the allowance of a user action by a system. In embodiments, when a service 250 becomes unavailable because of another user controlling a limited service or offline maintenance, the user will not be able to access the service.

Computer Support

Figure 4:
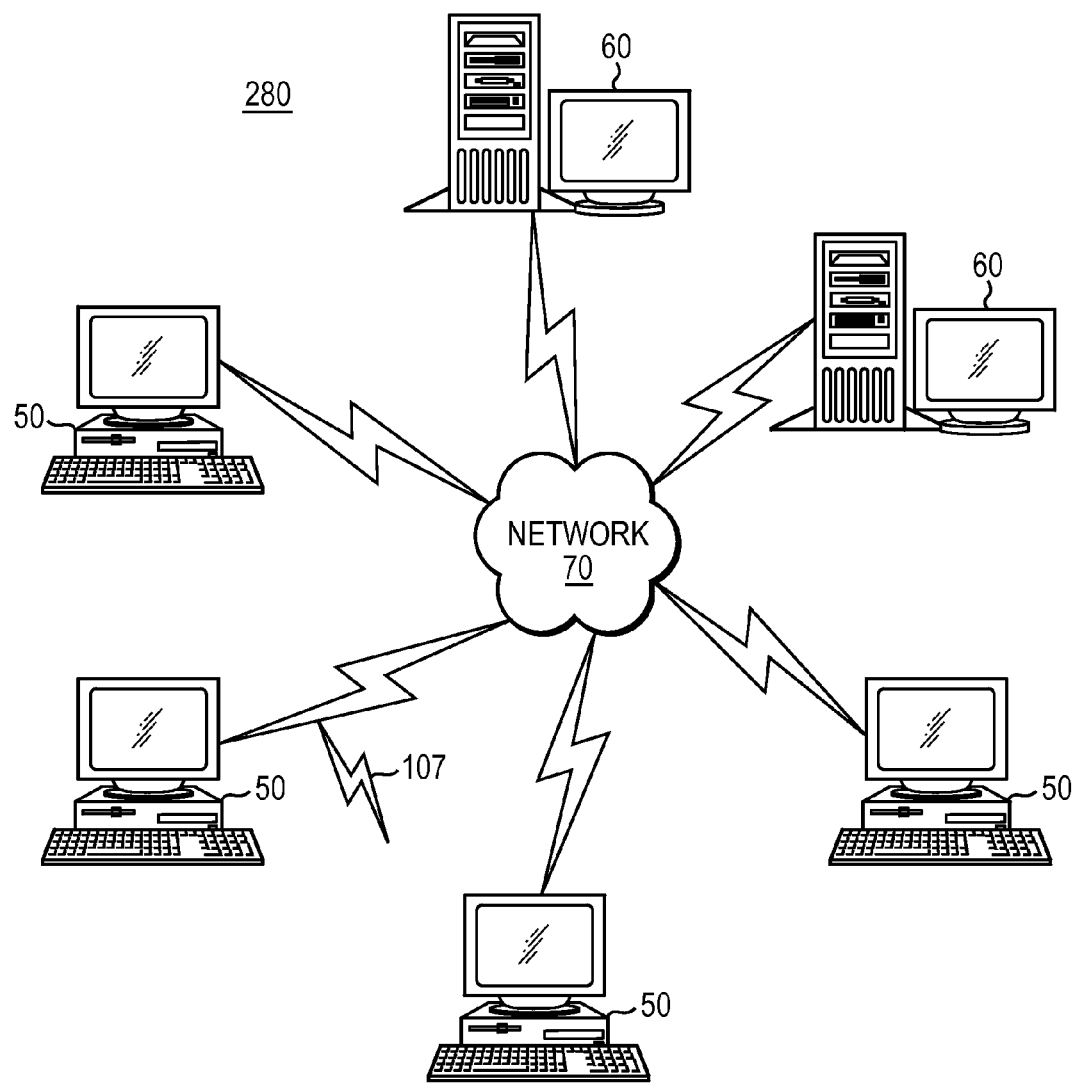
FIG. 4 illustrates a computer network or similar digital processing environment in which embodiments may be implemented.

FIG. 4 illustrates a computer network or similar digital processing environment in which an embodiment of the proposed approach may be implemented.

Client computer(s)/device(s) 50 and server computer(s) 60 provide processing, storage, and input/output devices executing application programs and the like. Client computers/devices 50 may be for example desktops, laptops, mobile devices and so forth (and are synonymous with clients 40 of FIG. 2A). The Adapter 251 functions as a smart proxy or placeholder for a single application instance, which can serve a single user at a time similar to a desktop application. The Service Module 250 is comprised of various pieces including an Adapter/Proxy 251, Application Instance 252, and optionally a Monitor 253, which are necessary to deliver, for non-limiting example, a simulation service to a client 50. The Service Platform may contain one or more service modules 250. A single client computer/device 50 or server computer 60 may host one or more instances of an application 252.

Client computer(s)/devices 50 may also be linked through communications network 70 to other computing devices, including other client devices/processes 50 and server computer(s) 60. Communications network 70 may be part of a remote access network, a global or local network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 5:
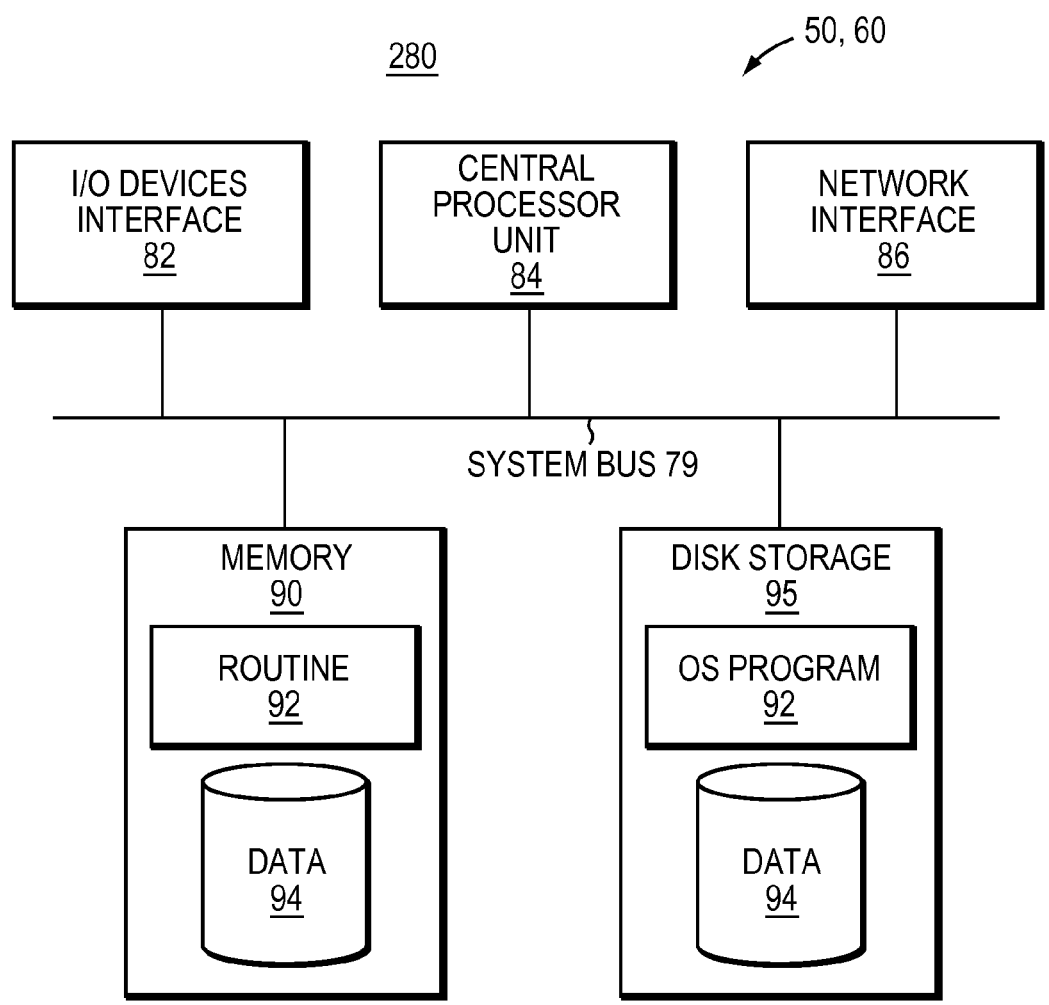
FIG. 5 is a block diagram of the internal structure of a computer node, such as a mobile device, portable process, client, or server in the computer network of FIG. 4.

FIG. 5 is a diagram of the internal structure of a computer (e.g., client processor/device 50 or server computers 60) in the computer system of FIG. 4. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 4). Memory 90 provides volatile storage for computer software instructions 92 and data 94 used to implement an embodiment of the proposed approach (e.g., system 280, supporting stateful application software service operations and supporting code detailed above). Disk storage 95 provides non-volatile storage for computer software instructions 92 and data 94 used to implement an embodiment of the proposed approach. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 may be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for an embodiment of the proposed approach routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of managing process plant resources for a user group of at least one user comprising:
    allocating and registering one or more resource adapters with a digital resource manager during initialization, the registering placing each allocated and registered resource adapter into a first resource pool at the digital resource manager, the first resource pool being a ready pool that indicates that an allocated and registered resource adapter is available not currently in use, wherein each allocated and registered resource adapter controls a coupled enterprise application instance, and the digital resource manager is executed by a processor;
    contacting the digital resource manager with a request for assignment of an enterprise application instance coupled to one of the allocated and registered resource adapters in the first resource pool, the request made through a user interface by a given user of the user group, wherein the digital resource manager determines availability of the allocated and registered resource adapter in the first resource pool;
    upon determining an available allocated and registered resource adapter, generating a binding identification and communicating a binding notification from the digital resource manager to activate the allocated and registered resource adapter to run the assigned enterprise application instance, the allocated and registered resource adapter, as activated, being an activated resource adapter, the digital resource manager moving the activated resource adapter to a second resource pool at the digital resource manager, the second resource pool being a bound pool that indicates that the activated resource adapter is now in use; and
    upon termination of the assigned enterprise application instance, moving the activated resource adapter to a third resource pool, the third resource pool being a dead pool that indicates that the activated resource adapter is removed or defunct; and
    monitoring, by the activated resource adapter, both the activated resource adapter itself and the assigned enterprise application instance, the activated resource adapter performing one or more of terminating, restarting, or repairing the assigned enterprise application instance asynchronously with respect to the digital resource manager obtaining a new application instance.

2. The method of claim 1 wherein activating the available allocated and registered resource adapter employs a resource agent, wherein the resource agent runs locally on a service platform server.

3. The method of claim 1 further comprising providing service access to the given user of the user group by requests made through a user interface to the activated resource adapter, wherein the activated resource adapter receives requests and publishes events, responses, heartbeat messages and notifications on behalf of itself and the coupled enterprise application instance.

4. The method of claim 3 wherein the digital resource manager uses the published information to determine the availability of the activated resource adapter coupled to the enterprise application instance.

5. The method of claim 1 wherein the digital resource manager is a computer-based service.

6. A computer system for managing resources for a user group of at least one user comprising:
    a resource manager service executed by a processor; and
    one or more resource adapters coupled to respective enterprise application instances, the resource manager service allocating and registering the one or more resource adapters during initialization, the registering placing each allocated and registered resource adapter into a first resource pool by the resource manager service, the first resource pool being a ready pool that indicates that an allocated and registered resource adapter is available not currently in use, wherein each allocated and registered resource adapter controls the respective coupled enterprise application instance;
    for a subject enterprise application instance, the resource manager service receiving a request for assignment of an enterprise application instance coupled to one of the allocated and registered resource adapters in the first resource pool, the request made through a user interface by a given user of the user group, wherein the resource manager service determines availability of the allocated and registered resource adapter in the first resource pool by the resource manager service;
    upon determining an available allocated and registered resource adapter, the resource manager service generating a binding identification and communicating a binding notification from the resource manager service to activate the allocated and registered resource adapter to run the assigned enterprise application instance, the allocated and registered resource adapter, as activated, being an activated resource adapter, the resource manager service moving the activated resource adapter to a second resource pool, the second resource pool being a bound pool that indicates that the activated resource adapter is now in use; and upon termination of the assigned enterprise application instance, moving the activated resource adapter to a third resource pool, the third resource pool being a dead pool that indicates that the activated resource adapter is removed or defunct; and the activated resource adapter monitoring both the activated resource adapter itself and the assigned enterprise application instance, the activated resource adapter performing one or more of terminating, restarting, or repairing the assigned enterprise application instance asynchronously with respect to the digital resource manager obtaining a new application instance.

7. A system of claim 6 wherein activating the available allocated and registered resource adapter employs a resource agent, wherein the resource agent runs locally on a service platform server.

8. A computer program product providing method of managing resources for a user group of at least one user comprising:
   a non-transitory computer useable medium having a computer readable program;
   wherein the computer readable program when executed on a computer causes one or more computers to:
   provide a digital resource manager;
   allocate and register one or more resource adapters with the digital resource manager during initialization, the registering placing each allocated and registered resource adapter into a first resource pool at the digital resource manager, the first resource pool being a ready pool that indicates that an allocated and registered resource adapter is available not currently in use, wherein each allocated and registered resource adapter controls a coupled enterprise application instance;
   contact the digital resource manager with a request for assignment of an enterprise application instance coupled to one of the allocated and registered resource adapters in the first resource pool, the request made through a user interface by a given user of the user group, wherein the digital resource manager determines availability of an allocated and registered resource adapter in the first resource pool;
   upon determining an available allocated and registered resource adapter, generate a binding identification and communicating a binding notification from the digital resource manager to activate the allocated and registered resource adapter to run the assigned enterprise application instance, the allocated and registered resource adapter, as activated, being an activated resource adapter, the digital resource manager moving the activated resource adapter to a second resource pool at the digital resource manager, the second resource pool being a bound pool that indicates that the activated resource adapter is now in use; and upon termination of the assigned enterprise application instance, move the activated resource adapter to a third resource pool, the third resource pool being a dead pool that indicates that the activated resource adapter is removed or defunct; and monitor, by the activated resource adapter, both the activated resource adapter itself and the assigned enterprise application instance, the activated resource adapter performing one or more of terminating, restarting, or repairing the assigned enterprise application instance asynchronously with respect to the digital resource manager obtaining a new application instance.

9. The product of claim 8 wherein activating the available allocated and registered resource adapter employs a resource agent, wherein the resource agent runs locally on a service platform server.

10. The product of claim 8 wherein the digital resource manager is a service executable on a processor.

11. The method of claim 1 further comprising detecting a switchover event through the digital resource manager, the digital resource manager identifying the assigned enterprise application instance as an application instance identified for removal.

12. The method of claim 11 further comprising the activated resource adapter detecting an additional switchover event and terminating the assigned enterprise application instance in response to said detecting the additional switchover event.

13. The method of claim 1, further comprising the activated resource adapter intercommunicating with both the assigned enterprise application instance and the digital resource manager.

14. The method of claim 12, further comprising the activated resource adapter intercommunicating with both the assigned enterprise application instance and the digital resource manager.

15. The method of claim 1 wherein the digital resource manager service includes a live plant data service and a simulation modeling service.

16. The method of claim 1 wherein the computer responsively displays to the given user simulation data of the simulation modeling service, and plant data of the live plant data service.

17. The method of claim 1 wherein the simulation data and plant data are displayed in a side-by-side manner.

* * * * *